(12) United States Patent
Yang et al.

(10) Patent No.: US 9,967,116 B2
(45) Date of Patent: May 8, 2018

(54) TRANSCEIVER

(71) Applicant: Huawei Technologies Co., Ltd., Shenzhen, Guangdong (CN)

(72) Inventors: Bo Yang, Chengdu (CN); Hua Cai, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/416,800

(22) Filed: Jan. 26, 2017

(65) Prior Publication Data

US 2017/0149588 A1    May 25, 2017

Related U.S. Application Data

(63) Continuation of application No. PCT/CN2014/083217, filed on Jul. 29, 2014.

(51) Int. Cl.
*H04L 25/14* (2006.01)
*H04W 24/02* (2009.01)
(Continued)

(52) U.S. Cl.
CPC .............. *H04L 25/14* (2013.01); *H04L 7/033* (2013.01); *H04L 25/49* (2013.01); *H04W 24/02* (2013.01)

(58) Field of Classification Search
CPC .......... H04L 25/14; H04L 7/033; H04L 25/49; H04W 24/02
See application file for complete search history.

(56) References Cited

U.S. PATENT DOCUMENTS 6,118,810 A * 9/2000 Wynn ..................... H04B 1/30
375/219
7,392,026 B2   6/2008 Alam et al.
(Continued)

FOREIGN PATENT DOCUMENTS

CN      101316105 A    12/2008
CN      101588184 A    11/2009
(Continued)

OTHER PUBLICATIONS

Ke-Hou Chen et al., "A Dual-band 61.4~63GHz/75.5~77.5GHz CMOS Receiver in a 90nm Technology", Jun. 18-20, 2008, 2 pages.

*Primary Examiner* — Janice Tieu

(57) ABSTRACT

A transceiver includes: a baseband control apparatus (21); an up-conversion apparatus (22), connected to the baseband control apparatus (21), and configured to perform up-conversion on a baseband signal generated by the baseband control apparatus (21), to obtain an intermediate frequency signal; at least two radio frequency channels (23) disposed in parallel, connected to the up-conversion apparatus (22), and configured to perform frequency conversion, amplification, and filtering on the intermediate frequency signal, to obtain a radio frequency signal corresponding to the frequency band covered by the each radio frequency channel; and an antenna (24), connected in series with an output end of any radio frequency channel of the at least two radio frequency channels (23), and configured to transmit the radio frequency signal obtained by the radio frequency channel. The transceiver enables relatively high wireless communication performance when an ultra wide bandwidth is implemented.

16 Claims, 10 Drawing Sheets

(51) Int. Cl.
*H04L 25/49* (2006.01)
*H04L 7/033* (2006.01)

(56) References Cited

U.S. PATENT DOCUMENTS

| | | |
|---|---|---|
| 7,792,513 B2 | 9/2010 | Safarian et al. |
| 2009/0325598 A1* | 12/2009 | Guigne ............... G01S 5/021 |
| | | 455/456.1 |
| 2012/0201330 A1 | 8/2012 | McHenry |

FOREIGN PATENT DOCUMENTS

| | | |
|---|---|---|
| CN | 101873148 A | 10/2010 |
| CN | 102882539 A | 1/2013 |

\* cited by examiner

TRANSCEIVER

CROSS-REFERENCE TO RELATED APPLICATIONS

This application is a continuation of International Application No. PCT/CN2014/083217, filed on Jul. 29, 2014, the disclosure of which is hereby incorporated by reference in its entirety.

TECHNICAL FIELD

Embodiments of the present application relate to wireless communications technologies, and in particular, to a transceiver.

BACKGROUND

With the continuous development of society, people impose increasing demands on a wireless communication service capacity. For wireless communications evolving from 2G to 3G and then to 4G, an increase of a service capacity is always the most importance; therefore, a radio transceiver required to support a large service capacity with feature of wideband. However, for conventional wireless communications, a wireless communications system generally works in a wireless spectrum less than 6 GHz, and it is quite difficult to meet an increasing demand for a service capacity. In addition, countries worldwide have strict and clear divisions of wireless spectrums, but there still has a relatively large difference between the divisions. Therefore, development of ultra-wideband wireless communications adaptive to spectrum divisions of the countries has attracted a lot of attention.

FIG. 1 shows an architecture of an ultra-wideband receiver with a distributed structure. As shown in FIG. 1, in the structure, a received radio frequency signal ($V_{in}(t)$) is fed back in sequence to amplification and frequency-conversion links (marked as 230-1, 230-2, . . . 230-$n$ in the figure) that are in a parallel, and a local oscillator signal (Local Oscillator signal, LO signal for short) is also fed back in sequence to local oscillator ports of mixers (Mixer) (marked as 235-1, 235-2, . . . 235-$n$ in the figure). A traveling wave relationship is formed between the received radio frequency signal ($V_{in}(t)$) and the local oscillator signal (LO signal), so as to implement a wideband receiver solution. However, when the architecture works in a relatively wide frequency band, communication performance is relatively low.

SUMMARY

Embodiments of the present application provide a transceiver, so that a working frequency of the transceiver is automatically configured according to different frequency requirements, to maintain relatively high wireless communication performance when an ultra wide bandwidth is implemented.

According to a first aspect, an embodiment of the present application provides a transmitter, including:
 a baseband control apparatus, configured to generate a baseband signal;
 an up-conversion apparatus, connected to the baseband control apparatus, and configured to perform up-conversion on the baseband signal generated by the baseband control apparatus, to obtain an intermediate frequency signal;
 at least two radio frequency channels disposed in parallel, where one side of the at least two radio frequency channels is connected in series with the up-conversion apparatus by using a second switch; the at least two radio frequency channels jointly cover an entire frequency band of a radio frequency signal; and each radio frequency channel covers a different frequency band of the radio frequency signal, and is configured to perform frequency conversion, amplification, and filtering on the intermediate frequency signal obtained by the up-conversion apparatus, to obtain a radio frequency signal corresponding to the frequency band covered by the each radio frequency channel; and
 an antenna, where the antenna is connected in series with an output end of one radio frequency channel of the at least two radio frequency channels by using a first switch, and is configured to transmit the radio frequency signal obtained by the radio frequency channel connected to the antenna.

In a first possible implementation manner of the first aspect, the up-conversion apparatus includes an in-phase modulation channel, a quadrature modulation channel that is disposed in parallel with the in-phase modulation channel, and a synthesizer, where
 the in-phase modulation channel is connected to the baseband control apparatus, and is configured to perform up-conversion on the baseband signal generated by the baseband control apparatus, to obtain an in-phase intermediate frequency signal;
 the quadrature modulation channel is connected to the baseband control apparatus, and is configured to perform up-conversion on the baseband signal generated by the baseband control apparatus, to obtain a quadrature intermediate frequency signal; and
 a first end of the synthesizer is connected to an output end of the in-phase modulation channel, a second end of the synthesizer is connected to an output end of the quadrature modulation channel, and a third end of the synthesizer is used as an output end of the up-conversion apparatus; and the synthesizer is configured to synthesize the in-phase intermediate frequency signal obtained by the in-phase modulation channel and the quadrature intermediate frequency signal obtained by the quadrature modulation channel, to obtain the intermediate frequency signal.

With reference to the first possible implementation manner of the first aspect, in a second possible implementation manner of the first aspect, the in-phase modulation channel includes a first digital-to-analog converter, and a first filter and a first modulator that are disposed in series with the first digital-to-analog converter, where an input end of the first digital-to-analog converter is connected to the baseband control apparatus, and is configured to convert the baseband signal generated by the baseband control apparatus into a first analog signal; an input end of the first filter is connected to an output end of the first digital-to-analog converter, and is configured to filter the first analog signal obtained outputted by the first digital-to-analog converter, to obtain a first filtered signal; a first end of the first modulator is connected to an output end of the first filter, a second end of the first modulator is connected to a frequency divider, the frequency divider is configured to provide a first modulation signal for the first modulator (2213), and a third end of the first modulator (2213) is connected to the first end of the synthesizer (223); and the first modulator (2213) is configured to modulate, by using the first modulation signal provided by the frequency divider (26), the first filtered signal obtained outputted by the first filter (2212), to obtain the in-phase intermediate frequency signal; and the quadrature modulation channel includes a second digital-to-analog converter, and a second filter and a second modulator that are disposed in series with the second digital-to-analog converter, where an input end of the second digital-to-analog converter is connected to the baseband control apparatus, and the second modulator is configured to convert the baseband signal generated by the baseband control apparatus into a second analog signal; an input end of the second filter is connected to an output end of the second digital-to-analog converter, and is configured to filter the second analog signal obtained outputted by the second digital-to-analog converter, to obtain a second filtered signal; a first end of the second modulator is connected to an output end of the second filter, a second end of the second modulator is connected to the frequency divider, the frequency divider is configured to provide a second modulation signal for the second modulator, a phase difference between the second modulation signal and the first modulation signal is a preset value, and a third end of the second modulator is connected to the second end of the synthesizer; and is configured to modulate, by using the second modulation signal provided by the frequency divider, the second filtered signal obtained outputted by the second filter, to obtain the quadrature intermediate frequency signal, where a signal that is input to the frequency divider is provided by at least one phase-locked loop.

With reference to any one of the first aspect, or the first to the second possible implementation manners of the first aspect, in a third possible implementation manner of the first aspect, at least one of the at least two radio frequency channels is a superheterodyne structure link, and the superheterodyne structure link includes:

a first mixer, where a first end of the first mixer is connected to the output end of the up-conversion apparatus by using the second switch, and a second end of the first mixer is connected to the phase-locked loop by using a third switch and a fourth switch; and the first mixer is configured to: receive a first local oscillator signal provided by the phase-locked loop, and perform, according to the first local oscillator signal provided by the phase-locked loop, frequency conversion on the intermediate frequency signal obtained by the up-conversion apparatus, to obtain a frequency-converted signal;

a first amplifier, where an input end of the first amplifier is connected to an output end of the first mixer, and is configured to amplify the frequency-converted signal output by the first mixer, to obtain an amplified signal; and a third filter, where an input end of the third filter is connected to an output end of the first amplifier, and is configured to filter the amplified signal obtained by the first amplifier, to obtain a radio frequency signal; and an output end of the third filter is used as an output end of the radio frequency channel.

With reference to the third possible implementation manner of the first aspect, in a fourth possible implementation manner of the first aspect, at least one of the at least two radio frequency channels is a zero-IF structure link, and the zero-IF structure link includes:

a second amplifier, where an input end of the second amplifier is connected to the output end of the up-conversion apparatus by using the second switch, and is configured to amplify the intermediate frequency signal obtained by the up-conversion apparatus, to obtain an amplified signal; and a fourth filter, where an input end of the fourth filter is connected to an output end of the second amplifier, and is configured to filter the amplified signal obtained by the second amplifier, to obtain a radio frequency signal corresponding to the frequency band covered by the at least one zero-IF structure link; and an output end of the fourth filter is used as an output end of the radio frequency channel.

With reference to any one of the first aspect, or the first to the fourth possible implementation manners of the first aspect, in a fifth possible implementation manner of the first aspect, the transmitter further includes:

an auxiliary channel, connected to the baseband control apparatus, and configured to transmit frequency configuration information and system information between the auxiliary channel and the baseband control apparatus, where the baseband control apparatus is further configured to control, by using the frequency configuration information, selection of the at least two radio frequency channels and selection of local oscillators corresponding to the at least two radio frequency channels.

With reference to the fifth possible implementation manner of the first aspect, in a sixth possible implementation manner of the first aspect, the auxiliary channel includes a transmit auxiliary channel, where the transmit auxiliary channel includes a third digital-to-analog converter, and a fifth filter, a second mixer, a third amplifier and a sixth filter that are disposed in series with the third digital-to-analog converter, where an input end of the third digital-to-analog converter is connected to the baseband control apparatus, and is configured to perform digital-to-analog conversion on the frequency configuration information transmitted by the baseband control apparatus, to obtain a third analog signal;

an input end of the fifth filter is connected to an output end of the third digital-to-analog converter, and is configured to filter the third analog signal obtained by the third digital-to-analog converter, to obtain a third filtered signal;

a first end of the second mixer is connected to an output end of the fifth filter, and a second end of the second mixer is connected to an auxiliary-channel voltage-controlled oscillator; the auxiliary-channel voltage-controlled oscillator is configured to provide a second local oscillator signal for the second mixer; and the second mixer is configured to perform, according to the second local oscillator signal provided by the auxiliary-channel voltage-controlled oscillator, frequency conversion on the third filtered signal obtained by the fifth filter, to obtain a frequency-converted signal;

an input end of the third amplifier is connected to an output end of the second mixer, and is configured to amplify the frequency-converted signal obtained by the second mixer, to obtain an amplified signal; and an input end of the sixth filter is connected to an output end of the third amplifier, and is configured to filter the amplified signal obtained by the third amplifier, to obtain a pre-transmit signal or obtain a control signal for controlling selection of the at least two radio frequency channels and selection of the local oscillators corresponding to the at least two radio frequency channels; and an output end of the sixth filter is used as an output end of the transmit auxiliary channel and is connected to an antenna.

With reference to the fifth or the sixth possible implementation manner of the first aspect, in a seventh possible implementation manner of the first aspect, the auxiliary channel further includes a receive auxiliary channel, where the receive auxiliary channel includes an analog-to-digital converter, and a seventh filter, a third mixer, a fourth amplifier and an eighth filter that are disposed in series with the analog-to-digital converter, where an output end of the analog-to-digital converter is connected to the baseband control apparatus, and is configured to: perform analog-to-digital conversion on a fourth filtered signal obtained outputted by the seventh filter, to obtain a converted signal, and transmit the converted signal to the baseband control apparatus;

an output end of the seventh filter is connected to an input end of the analog-to-digital converter, and is configured to filter a frequency-converted signal obtained outputted by the third mixer, to obtain the fourth filtered signal, and transmit the fourth filtered signal to the analog-to-digital converter;

a first end of the third mixer is connected to an input end of the seventh filter, a second end of the third mixer is connected to an output end of the fourth amplifier, and a third end of the third mixer is connected to the auxiliary-channel voltage-controlled oscillator; the auxiliary-channel voltage-controlled oscillator is configured to provide a third local oscillator signal for the third mixer; and the third mixer is configured to: perform frequency conversion processing on an amplified signal obtained outputted by the fourth amplifier, and transmit a frequency-converted signal to the seventh filter;

an input end of the fourth amplifier is connected to an output end of the eighth filter, and is configured to amplify a filtered signal obtained by the eighth filter, to obtain the amplified signal; and an input end of the eighth filter is connected to the antenna, and the input end of the eighth filter is used as an input end of the receive auxiliary channel and is configured to filter a signal received by the antenna, to obtain the filtered signal.

According to a second aspect, an embodiment of the present application provides a receiver, including: at least two radio frequency channels disposed in parallel, a down-conversion apparatus, a baseband control apparatus, a first switch, a second switch, and an antenna, where the antenna is connected in series with an input end of one radio frequency channel of the at least two radio frequency channels by using the first switch, and is configured to: receive a radio frequency signal transmitted by a transmitter, and transmit the radio frequency signal to the radio frequency channel connected to the antenna;

the at least two radio frequency channels each is configured to perform frequency conversion, amplification, and filtering on a radio frequency signal corresponding to the frequency band covered by the at least one radio frequency channels, which is received by the antenna, to obtain an intermediate frequency signal. wherein the at least two radio frequency channels jointly cover an entire frequency band of the radio frequency signal, and the part of radio frequency signal corresponds to a frequency band covered by the each radio frequency channel; and the down-conversion apparatus is connected, by using the second switch, to an output end of the radio frequency channel of the at least two radio frequency channels that is connected to the antenna, and is configured to perform down-conversion on the intermediate frequency signal obtained by the radio frequency channel, to obtain a preprocessing signal of the baseband control apparatus.

In a first possible implementation manner of the second aspect, the down-conversion apparatus includes an in-phase demodulation channel, a quadrature demodulation channel that is disposed in parallel with the in-phase demodulation channel, and a decomposer, where the decomposer is configured to decompose the intermediate frequency signal obtained by the radio frequency channel into an in-phase intermediate frequency signal and a quadrature intermediate frequency signal, where a first end of the decomposer is used as an input end of the down-conversion apparatus, a second end of the decomposer is connected to an input end of the in-phase demodulation channel, and a third end of the decomposer is connected to an input end of the quadrature demodulation channel the in-phase demodulation channel is connected to the baseband control apparatus, and is configured to: perform down-conversion on the in-phase intermediate frequency signal obtained by the decomposer, to obtain an in-phase baseband signal, and transmit the in-phase baseband signal to the baseband control apparatus; and the quadrature demodulation channel is connected to the baseband control apparatus, and is configured to: perform down-conversion on the quadrature intermediate frequency signal obtained by the decomposer, to obtain a quadrature baseband signal, and transmit the quadrature baseband signal to the baseband control apparatus.

With reference to the first possible implementation manner of the second aspect, in a second possible implementation manner of the second aspect, the in-phase demodulation channel includes a first analog-to-digital converter, and a first filter and a first demodulator that are disposed in series with the first analog-to-digital converter, where a first end of the first demodulator is used as the input end of the in-phase demodulation channel, and a second end of the first demodulator is connected to a frequency divider; the frequency divider is configured to provide a first demodulation signal for the first demodulator, and the first demodulator is configured to demodulate, by using the first demodulation signal provided by the frequency divider, the in-phase intermediate frequency signal obtained by the decomposer, to obtain an in-phase demodulation signal; an input end of the first filter is connected to an output end of the first demodulator, and the first filter is configured to filter the in-phase demodulation signal obtained by the first demodulator, to obtain a first filtered signal; and an input end of the first analog-to-digital converter is connected to an output end of the first filter, and is configured to perform analog-to-digital conversion on the first filtered signal obtained by the first filter, to obtain the in-phase baseband signal, and an output end of the first analog-to-digital converter is connected to the baseband control apparatus; and the quadrature demodulation channel includes a second analog-to-digital converter, and a second filter and a second demodulator that are disposed in series with the second analog-to-digital converter, where a first end of the second demodulator is used as the input end of the quadrature demodulation channel, and a second end of the second demodulator is connected to the frequency divider; the frequency divider is further configured to provide a second demodulation signal for the second demodulator, and the second demodulator is configured to demodulate, by using the second demodulation signal provided by the frequency divider, the quadrature intermediate frequency signal obtained by the decomposer, to obtain a quadrature demodulation signal, where a phase difference between the second demodulation signal and the first demodulation signal is a preset value, and a signal that is inputted to the frequency divider is provided by at least one phase-locked loop; an input end of the second filter is connected to an output end of the second demodulator, and the second filter is configured to filter the quadrature demodulation signal obtained by the second demodulator, to obtain a second filtered signal; and an input end of the second analog-to-digital converter is connected to an output end of the second filter, the second analog-to-digital converter is configured to perform analog-to-digital conversion on the second filtered signal obtained by the second filter, to obtain the quadrature baseband signal, and an output end of the second analog-to-digital converter is connected to the baseband control apparatus.

With reference to any one of the second aspect, or the first to the second possible implementation manners of the second aspect, in a third possible implementation manner of the second aspect, at least one of the at least two radio frequency channels is a superheterodyne structure link, and the superheterodyne structure link includes: a third filter, a first amplifier, and a first mixer, where the third filter is connected to the first amplifier in sequence, an input end of the third filter is used as an input end of the at least one radio frequency channel, and the third filter is configured to filter a radio frequency signal received by the antenna, which is corresponding to the frequency band covered by the at least one superheterodyne structure link, to obtain a third filtered signal;

an input end of the first amplifier is connected to an output end of the third filter, and the first amplifier is configured to amplify the third filtered signal obtained by the third filter, to obtain a first amplified signal; and a first end of the first mixer is connected to an output end of the first amplifier; a second end of the first mixer is connected to the phase-locked loop by using a third switch and a fourth switch, and is configured to receive a first local oscillator signal provided by the phase-locked loop; an output end of the first mixer is connected to the input end of the down-conversion apparatus by using the second switch; and the first mixer is configured to perform, according to the first local oscillator signal provided by the phase-locked loop, frequency conversion on the first amplified signal obtained by the first amplifier, to obtain the intermediate frequency signal.

With reference to the third possible implementation manner of the second aspect, in a fourth possible implementation manner of the second aspect, at least one of the at least two radio frequency channels is a zero-IF structure link, and the zero-IF structure link includes: a fourth filter and a second amplifier, where the fourth filter is connected to the second amplifier in sequence, an input end of the fourth filter is used as an input end of the at least one radio frequency channel, and the fourth filter is configured to filter a radio frequency signal received by the antenna, which is corresponding to the at least one zero-IF structure link, to obtain a fourth filtered signal; and an input end of the second amplifier is connected to an output end of the fourth filter; the second amplifier is configured to amplify the fourth filtered signal obtained by the fourth filter, to obtain the intermediate frequency signal; and an output end of the second amplifier is connected to the input end of the down-conversion apparatus by using the second switch.

With reference to any one of the second aspect, or the first to the fourth possible implementation manners of the second aspect, in a fifth possible implementation manner of the second aspect, the receiver further includes:

an auxiliary channel, connected to the baseband control apparatus, and configured to transmit frequency configuration information and system information between the auxiliary channel and the baseband control apparatus, where the baseband control apparatus is further configured to control, by using the frequency configuration information, selection of the at least two radio frequency channels and selection of local oscillators corresponding to the at least two radio frequency channels.

With reference to the fifth possible implementation manner of the second aspect, in a sixth possible implementation manner of the second aspect, the auxiliary channel includes a receive auxiliary channel, and the receive auxiliary channel includes a digital-to-analog converter, and a fifth filter, a second mixer, a third amplifier and a sixth filter that are disposed in series with the digital-to-analog converter, where an output end of the digital-to-analog converter is connected to the baseband control apparatus, an input end of the digital-to-analog converter is connected to an output end of the fifth filter, and the digital-to-analog converter is configured to: perform digital-to-analog conversion on a fifth filtered signal obtained by the fifth filter, to obtain a converted signal, and transmit the converted signal to the baseband control apparatus;

an input end of the fifth filter is connected to an output end of the second mixer, and is configured to filter a frequency-converted signal obtained by the second mixer, to obtain the fifth filtered signal;

a first end of the second mixer is connected to an output end of the third amplifier, and a second end of the second mixer is connected to an auxiliary-channel voltage-controlled oscillator; the auxiliary-channel voltage-controlled oscillator is configured to provide a second local oscillator signal for the second mixer; and the second mixer is configured to perform, according to the second local oscillator signal provided by the auxiliary-channel voltage-controlled oscillator, frequency conversion on an amplified signal obtained outputted by the third amplifier, to obtain the frequency-converted signal;

an input end of the third amplifier is connected to an output end of the sixth filter, and is configured to amplify a filtered signal obtained outputted by the sixth filter, to obtain the amplified signal; and an input end of the sixth filter is used as an input end of the receive auxiliary channel, is connected to an antenna, and is configured to filter the radio frequency signal received by the antenna, to obtain the filtered signal.

With reference to the fifth or the sixth possible implementation manner of the second aspect, in a seventh possible implementation manner of the second aspect, the auxiliary channel further includes a transmit auxiliary channel, where the transmit auxiliary channel includes a third analog-to-digital converter, and a seventh filter, a third mixer, a fourth amplifier and an eighth filter that are disposed in series with the third analog-to-digital converter, where an input end of the third analog-to-digital converter is connected to the baseband control apparatus, and is configured to perform analog-to-digital conversion on a pre-transmit signal or a control signal to obtain a digital signal, where the pre-transmit signal or the control signal is obtained by the baseband control apparatus, and the control signal is a control signal used by the baseband control apparatus to control selection of the at least two radio frequency channels and selection of the local oscillators corresponding to the at least two radio frequency channels;

an input end of the seventh filter is connected to an output end of the third analog-to-digital converter, and is configured to filter the digital signal obtained by the third analog-to-digital converter, to obtain a sixth filtered signal;

a first end of the third mixer is connected to an output end of the seventh filter, and a second end of the third mixer is connected to the auxiliary-channel voltage-controlled oscillator; the auxiliary-channel voltage-controlled oscillator is configured to provide a third local oscillator signal for the third mixer; and the third mixer is configured to perform frequency conversion on the sixth filtered signal obtained by the seventh filter, to obtain a frequency-converted signal;

an input end of the fourth amplifier is connected to an output end of the third mixer, and is configured to amplify the frequency-converted signal obtained outputted by the third mixer, to obtain an amplified signal; and an input end of the eighth filter is connected to an output end of the fourth amplifier, an output end of the eighth filter is used as an output end of the transmit auxiliary channel and is connected to the antenna, and the eighth filter is configured to filter the amplified signal obtained by the fourth amplifier, to obtain a signal to be transmitted by the antenna.

According to the embodiments of the present application, at least two radio frequency channels are disposed in parallel, each radio frequency channel covers a frequency range, and the radio frequency channels work in different working frequencies, so that relatively high wireless communication performance is maintained when an ultra wide bandwidth is implemented.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

Figure 1:
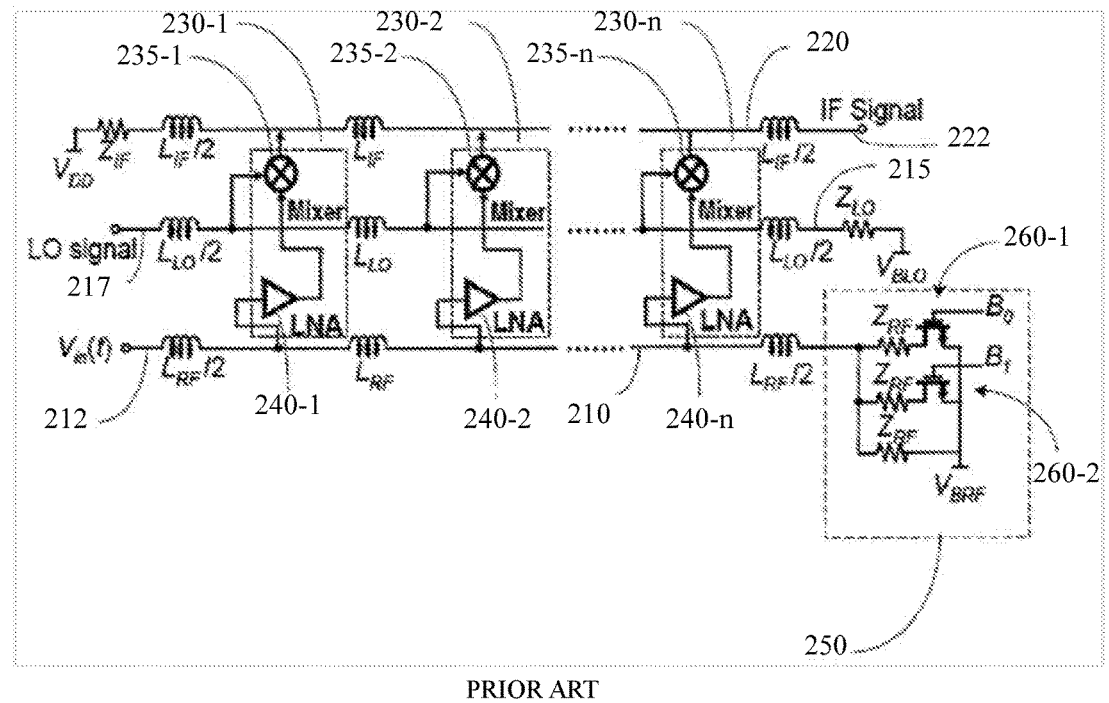
FIG. 1 shows an architecture of an ultra-wideband receiver with a distributed structure.
Figure 2:
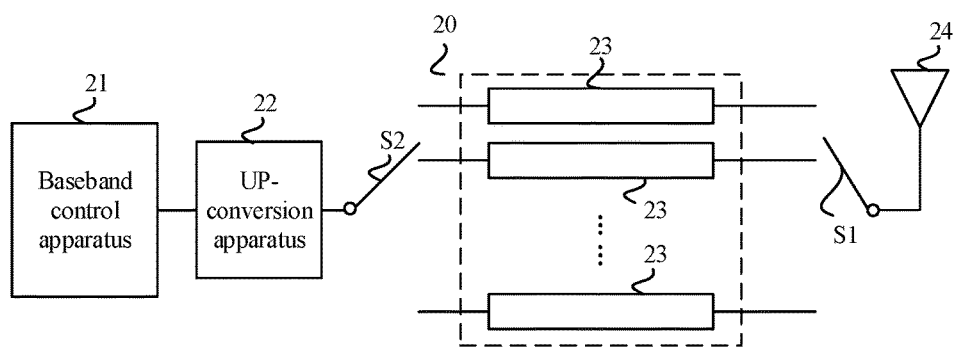
FIG. 2 is a schematic structural diagram of Embodiment 1 of a transmitter according to the present application.

FIG. 2 is a schematic structural diagram of Embodiment 1 of a transmitter according to the present application. This embodiment of the present application provides a transmitter. As shown in FIG. 2, the transmitter (20) includes a baseband control apparatus (21), an up-conversion apparatus (22), multiple radio frequency channels (23) disposed in parallel, an antenna (24), a first switch S1, and a second switch S2.

The baseband control apparatus (21) is configured to generate a baseband signal. The up-conversion apparatus (22) is connected to the baseband control apparatus (21), and is configured to perform up-conversion on the baseband signal generated by the baseband control apparatus (21), to obtain an intermediate frequency signal. One side of the at least two radio frequency channels (23) is connected in series with the up-conversion apparatus (22) by using the second switch S2. The at least two radio frequency channels (23) jointly cover an entire frequency band of a radio frequency signal. Each radio frequency channel covers a different frequency band of the radio frequency signal, and is configured to perform frequency conversion, amplification, and filtering on the intermediate frequency signal obtained by the up-conversion apparatus (22), to obtain a radio frequency signal t corresponding to the frequency band covered by the each radio frequency channel. The antenna (24) is connected in series with an output end of one radio frequency channel of the at least two radio frequency channels (23) by using the first switch S1, and is configured to transmit the radio frequency signal obtained by the radio frequency channel connected to the antenna (24).

In this embodiment of the present application, a wireless transmitter with a wide frequency coverage area can be implemented without increasing a difficulty in hardware implementation. The at least two radio frequency channels (23) are configured to support frequency conversion, amplification, and filtering functions for radio frequency signals in different frequency bands. In this way, radio frequency signals in different frequency bands are separated in terms of physical structures, thereby facilitating hardware implementation. The antenna (24) may be an ultra-wideband antenna, and is configured to transmit signals transmitted by the at least two radio frequency channels (23). The first switch S1 is configured to connect the antenna (24) to the different radio frequency channels (23).

In this embodiment of the present application, at least two radio frequency channels are disposed in parallel, each radio frequency channel covers a frequency range, and the radio frequency channels work in different working frequencies, so that relatively high wireless communication performance is maintained when an ultra wide bandwidth is implemented. In addition, a difficulty in hardware implementation can also be reduced to a greatest extent, and a relatively large performance gain can be obtained.

Optionally, there may be one or more antennas (24). When there are multiple antennas (24), the multiple antennas (24) each cooperatively work with a radio frequency channel, corresponding to each antenna (24), of the at least two radio frequency channels (23), so as to ensure strong performance of each antenna (24) within a working frequency band of the antenna (24). In addition, the multiple radio frequency channels (23) and the multiple antennas (24) may be in a one-to-one correspondence, or may be in a many-to-one or one-to-many correspondence, which is not limited in the present application.

The transmitter provided in this embodiment of the present application is described in detail by using a specific embodiment.

Figure 3:
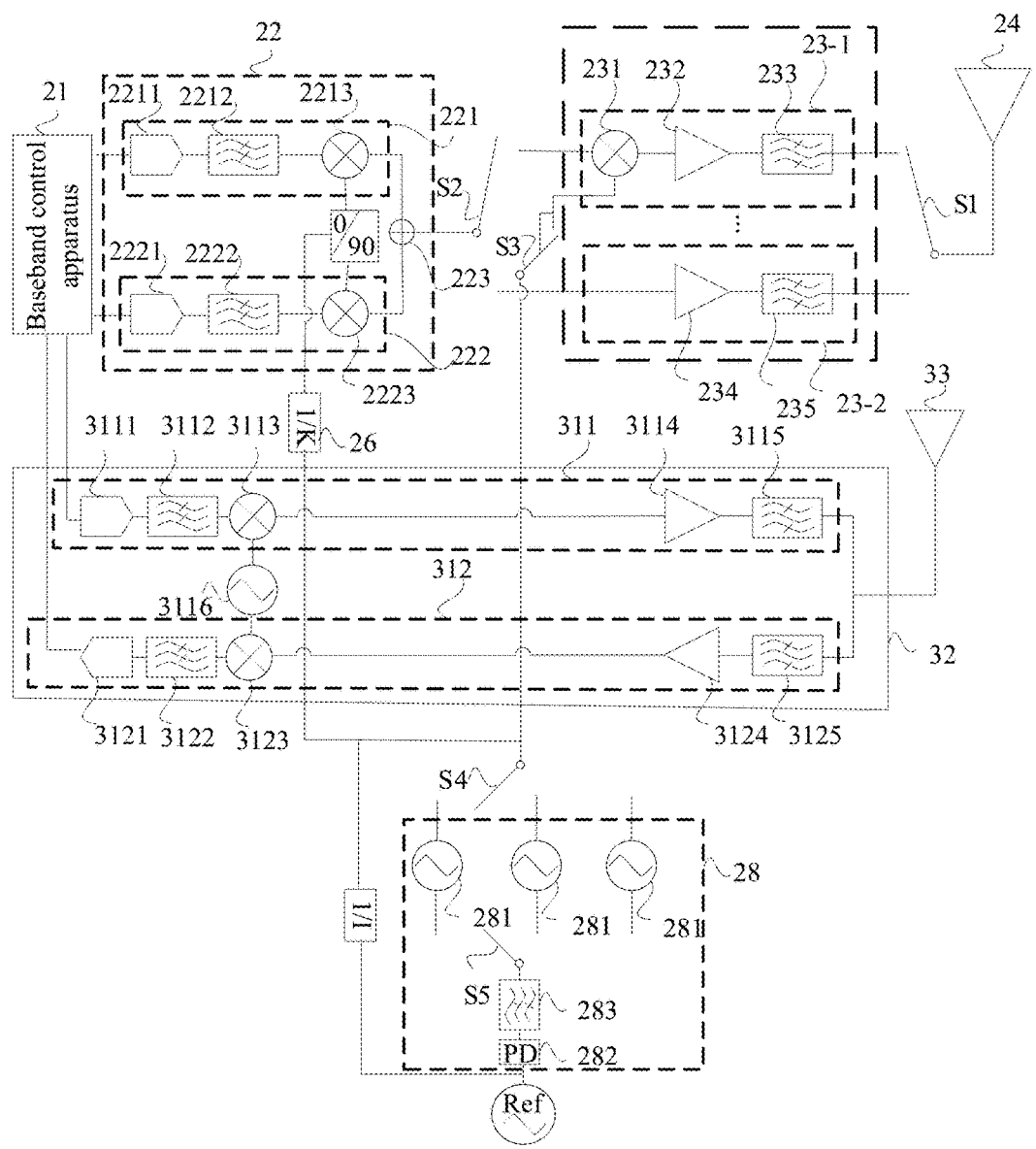
FIG. 3 is a schematic structural diagram of Embodiment 2 of a transmitter according to the present application.

FIG. 3 is a schematic structural diagram of Embodiment 2 of a transmitter according to the present application. This embodiment of the present application makes improvements based on the embodiment shown in FIG. 2. As shown in FIG. 3, the up-conversion apparatus (22) may include an in-phase modulation channel (221), a quadrature modulation channel (222) that is disposed in parallel with the in-phase modulation channel (221), and a synthesizer (223). The in-phase modulation channel (221) is connected to the baseband control apparatus (21), and is configured to perform up-conversion on the baseband signal generated by the baseband control apparatus (21), to obtain an in-phase intermediate frequency signal. The quadrature modulation channel (222) is connected to the baseband control apparatus (21), and is configured to perform up-conversion on the baseband signal generated by the baseband control apparatus (21), to obtain a quadrature intermediate frequency signal. A first end of the synthesizer (223) is connected to an output end of the in-phase modulation channel (221), a second end of the synthesizer (223) is connected to an output end of the quadrature modulation channel (222) and the quadrature intermediate frequency signal is input to the synthesizer (223), and a third end of the synthesizer (223) is used as an output end of the up-conversion apparatus (22). The synthesizer (223) is configured to synthesize the in-phase intermediate frequency signal obtained by the in-phase modulation channel (221) and the quadrature intermediate frequency signal obtained by the quadrature modulation channel (222), to obtain the intermediate frequency signal.

The in-phase modulation channel (221) may include a first digital-to-analog converter (2211), and a first filter (2212) and a first modulator (2213 that are disposed in series with the first digital-to-analog converter (2211). An input end of the first digital-to-analog converter (2211) is connected to the baseband control apparatus (21), and is configured to convert the baseband signal generated by the baseband control apparatus (21) into a first analog signal. An input end of the first filter (2212) is connected to an output end of the first digital-to-analog converter (2211), and is configured to filter the first analog signal obtained outputted by the first digital-to-analog converter (2211), to obtain a first filtered signal. A first end of the first modulator (2213) is connected to an output end of the first filter (2212), and a second end of the first modulator (2213) is connected to a frequency divider (26); the frequency divider (26) is configured to provide a first modulation signal for the first modulator (2213); and a third end of the first modulator (2213) is connected to the first end of the synthesizer (223). The first modulator (2213) is configured to modulate, by using the first modulation signal provided by the frequency divider (26), the first filtered signal obtained outputted by the first filter (2212), to obtain the in-phase intermediate frequency signal.

The quadrature modulation channel (222) may include a second digital-to-analog converter (2221), and a second filter (2222) and a second modulator (2223) that are disposed in series with the second digital-to-analog converter (2221). An input end of the second digital-to-analog converter (2221) is connected to the baseband control apparatus (21), and is configured to convert the baseband signal generated by the baseband control apparatus (21) into a second analog signal. An input end of the second filter (2222) is connected to an output end of the second digital-to-analog converter (2221), and is configured to filter the second analog signal obtained outputted by the second digital-to-analog converter (2221), to obtain a second filtered signal. A first end of the second modulator (2223) is connected to an output end of the second filter (2222), and a second end of the second modulator (2223) is connected to the frequency divider (26); the frequency divider (26) is configured to provide a second modulation signal for the second modulator (2223); a phase difference between the second modulation signal and the foregoing first modulation signal is a preset value (the preset value may be, for example, 90°); and a third end of the second modulator (2223) is connected to the second end of the synthesizer (223). The second modulator (2223) is configured to modulate, by using the second modulation signal provided by the frequency divider (26), the second filtered signal obtained outputted by the second filter (2222), to obtain the quadrature intermediate frequency signal. A signal that is input to the frequency divider (26) is provided by at least one phase-locked loop (28). The phase-locked loop (28) is a phase-locked loop that includes multiple voltage-controlled oscillators (Voltage Controlled Oscillator, VCO for short) (281). A VCO with a proper frequency band may be selected according to a different frequency configuration status, to provide a local oscillator signal for link frequency conversion. In addition, the phase-locked loop (28) further includes a phase detector (Phase Detector, PD for short) (282) and a loop filter (283). The phase detector (282) detects phase difference between input signals of the phase detector (282), and converts the detected phase difference into a voltage signal for output. After being filtered by using the loop filter (283), the voltage signal forms a control voltage of the voltage-controlled oscillator (281), to control a frequency of an output signal of the voltage-controlled oscillator (281).

It should be noted that, the at least two radio frequency channels (23) include a certain quantity of superheterodyne structure links and zero-IF structure links. That is, at least one of the at least two radio frequency channels is a superheterodyne structure link (23-1). The superheterodyne structure link (23-1) may include: a first mixer (231), where a first end of the first mixer (231) is connected to the output end of the up-conversion apparatus (22) by using the second switch S2, a second end of the first mixer (231) is connected to the phase-locked loop (28) by using a third switch S3 and a fourth switch S4, and the first mixer (231) is configured to receive a first local oscillator signal provided by the phase-locked loop (28), and perform, according to the first local oscillator signal provided by the phase-locked loop (28), frequency conversion on the intermediate frequency signal obtained by the up-conversion apparatus (22), to obtain a frequency-converted signal; a first amplifier (232), where an input end of the first amplifier (232) is connected to an output end of the first mixer (231), and is configured to amplify the frequency-converted signal output by the first mixer (231), to obtain an amplified signal; and a third filter (233), where an input end of the third filter (233) is connected to an output end of the first amplifier (232), and is configured to filter the amplified signal obtained by the first amplifier (232), to obtain a radio frequency signal. An output end of the third filter (233) is used as an output end of the radio frequency channel (23).

In addition, at least one of the at least two radio frequency channels is a zero-IF structure link (23-2). The zero-IF structure link (23-2) may include: a second amplifier (234), where an input end of the second amplifier (234 is connected to the output end of the up-conversion apparatus (22) by using the second switch S2, and is configured to amplify the intermediate frequency signal obtained by the up-conversion apparatus (22), to obtain an amplified signal; and a fourth filter (235), where an input end of the fourth filter (235) is connected to an output end of the second amplifier (234), and is configured to filter the amplified signal obtained by the second amplifier (234), to obtain a radio frequency signal corresponding to the at least one zero-IF structure link (23-2). An output end of the fourth filter (235) is used as an output end of the radio frequency channel (23).

In addition, the transmitter (20) may further include an auxiliary channel (32). The auxiliary channel (32) is connected to the baseband control apparatus (21), and is configured to transmit frequency configuration information and system information between the auxiliary channel (32) and the baseband control apparatus (21). The baseband control apparatus (21) may be further configured to control, by using the frequency configuration information, selection of the at least two radio frequency channels (23) and selection of local oscillators corresponding to the at least two radio frequency channels (23). The foregoing system information includes various kinds of system information when a communications system in which the transmitter (20) is located is used for networking; and a source of the frequency configuration information may be in multiple implementation forms, for example, an upper-layer software configuration.

Optionally, the transmitter (20) may further include an antenna (33). The antenna (33) is connected to the auxiliary channel (32), and is configured to: transmit a signal transmitted by the auxiliary channel (32), or receive a signal that is transmitted by another device by using an auxiliary channel of the another device and transmit the signal to the baseband control apparatus (21) by using the auxiliary channel (32). The antenna (33) and the antenna (24) may be a same antenna, or the antenna (33) is an exclusive antenna of the auxiliary channel (32), and is configured to transmit a signal transmitted by the auxiliary channel (32) and/or transmit a signal received by the antenna (33) to the auxiliary channel (32).

An auxiliary channel for implementing the foregoing functions may be in multiple forms, and details are described by using only an example herein. For example, the auxiliary channel (32) may include a transmit auxiliary channel (311), where the transmit auxiliary channel (311) may include a third digital-to-analog converter 3111, and a fifth filter (3112), a second mixer (3113), a third amplifier (3114) and a sixth filter (3115) that are disposed in series with the third digital-to-analog converter (3111).

An input end of the third digital-to-analog converter (3111) is connected to the baseband control apparatus (21), and is configured to perform digital-to-analog conversion on the frequency configuration information transmitted by the baseband control apparatus (21), to obtain a third analog signal. An input end of the fifth filter (3112) is connected to an output end of the third digital-to-analog converter (3111), and is configured to filter the third analog signal obtained by the third digital-to-analog converter (3111), to obtain a third filtered signal. A first end of the second mixer (3113) is connected to an output end of the fifth filter (3112), and a second end of the second mixer (3113) is connected to an auxiliary-channel voltage-controlled oscillator (3116); the auxiliary-channel voltage-controlled oscillator (3116) may be configured to provide a second local oscillator signal for the second mixer (3113); and the second mixer (3113) may be configured to perform, according to the second local oscillator signal provided by the auxiliary-channel voltage-controlled oscillator (3116), frequency conversion on the third filtered signal obtained by the fifth filter (3112), to obtain a frequency-converted signal. An input end of the third amplifier 3114 is connected to an output end of the second mixer (3113), and is configured to amplify the frequency-converted signal obtained by the second mixer (3113), to obtain an amplified signal. An input end of the sixth filter (3115) is connected to an output end of the third amplifier (3114), and is configured to filter the amplified signal obtained by the third amplifier (3114), to obtain a pre-transmit signal or obtain a control signal for controlling selection of the at least two radio frequency channels (23) and selection of the local oscillators corresponding to the at least two radio frequency channels (23). An output end of the sixth filter (3115) is used as an output end of the transmit auxiliary channel (311) and is connected to the antenna (33).

Further, the auxiliary channel (32 may further include a receive auxiliary channel (312). The receive auxiliary channel (312) may include an analog-to-digital converter (3121), and a seventh filter (3122), a third mixer (3123), a fourth amplifier (3124 and an eighth filter (3125) that are disposed in series with the analog-to-digital converter (3121).

An output end of the analog-to-digital converter (3121) is connected to the baseband control apparatus (21), and is configured to: perform analog-to-digital conversion on a fourth filtered signal obtained outputted by the seventh filter (3122), to obtain a converted signal, and transmit the converted signal to the baseband control apparatus (21). An output end of the seventh filter (3122) is connected to an input end of the analog-to-digital converter (3121), and is configured to: filter a frequency-converted signal obtained outputted by the third mixer (3123), to obtain the foregoing fourth filtered signal, and transmit the foregoing fourth filtered signal to the analog-to-digital converter (3121). A first end of the third mixer (3123 is connected to an input end of the seventh filter (3122), a second end of the third mixer (3123) is connected to an output end of the fourth amplifier (3124), and a third end of the third mixer (3123) is connected to the auxiliary-channel voltage-controlled oscillator (3116). The auxiliary-channel voltage-controlled oscillator (3116) may be configured to provide a third local oscillator signal for the third mixer (3123). The third mixer (3123) may be configured to: perform frequency conversion processing on an amplified signal obtained outputted by the fourth amplifier (3124), and transmit a frequency-converted signal to the seventh filter (3122). An input end of the fourth amplifier (3124) is connected to an output end of the eighth filter (3125), and is configured to amplify a filtered signal obtained by the eighth filter (3125), to obtain the foregoing amplified signal. An input end of the eighth filter (3125) is connected to the antenna (33), and the input end of the eighth filter (3125) is used as an input end of the receive auxiliary channel (312) and is configured to filter the signal received by the antenna (33), to obtain the foregoing filtered signal.

It should be additionally noted that, the foregoing auxiliary channel (32) may be further configured to transmit service data. Optionally, a working frequency of the auxiliary channel (32) may fall within an unlicensed frequency band, or may be a frequency band corresponding to a specific service, which is not limited in the present application.

According to this embodiment of the present application, an architecture of at least two radio frequency channels is used, and each radio frequency channel covers a frequency range. In this way, a difficulty in hardware design is reduced to a greatest extent, and a relatively large performance gain can be obtained. A specialized auxiliary channel is disposed on a transmitter end, which can transmit frequency configuration information in real time and can automatically complete a frequency configuration for a signal transmit end. In addition, the auxiliary channel also plays a role of a service transmission channel, and is configured to transmit service data, to implement efficient channel utilization. A solution of combining a superheterodyne structure with a zero-IF structure is used for the radio frequency channels, which can lower system complexity to a greatest extent on the premise that relatively high system performance is ensured. A switch is used to perform switching between radio frequency channels and between local oscillators, which can make full use of a baseband control apparatus to control the switch, and provide intelligent frequency switch.

Figure 4:
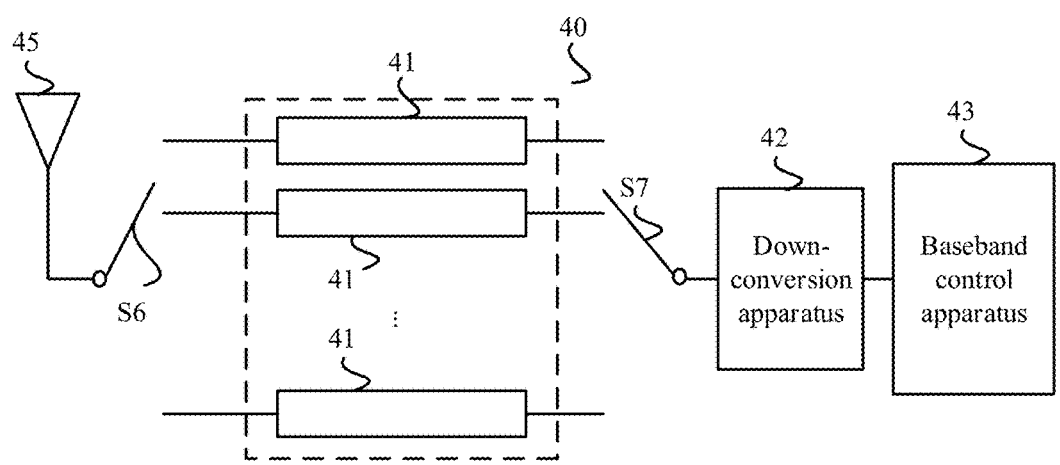
FIG. 4 is a schematic structural diagram of Embodiment 1 of a receiver according to the present application.

FIG. 4 is a schematic structural diagram of Embodiment 1 of a receiver according to the present application. This embodiment of the present application provides a receiver. As shown in FIG. 4, the receiver (40) includes at least two radio frequency channels (41) disposed in parallel, a down-conversion apparatus (42), a baseband control apparatus (43), a first switch S6, a second switch S7, and an antenna (45).

The antenna (45) is connected in series with an input end of one radio frequency channel of the at least two radio frequency channels (41) by using the first switch S6, and is configured to: receive a radio frequency signal transmitted by a transmitter, and transmit the radio frequency signal to the radio frequency channel connected to the antenna (45). The at least two radio frequency channels (41) each is configured to perform frequency conversion, amplification, and filtering on a radio frequency signal received by the antenna (45), which is corresponding to the frequency band covered by the at least one radio frequency channels to obtain an intermediate frequency signal, where the at least two radio frequency channels (41) jointly cover an entire frequency band of the foregoing radio frequency signal, and each radio frequency channel (41) covers a different frequency band of the radio frequency signal. The down-conversion apparatus (42) is connected, by using the second switch S7, to an output end of the radio frequency channel of the at least two radio frequency channels (41) that is connected to the antenna (45), and is configured to perform down-conversion on the intermediate frequency signal obtained by the radio frequency channel (41), to obtain a preprocessing signal of the baseband control apparatus (43).

Work of the receiver (40) in this embodiment is corresponding to that of the transmitter in the foregoing embodiment. After the transmitter transmits an ultra-wideband signal, the receiver (40) receives the ultra-wideband signal, and performs corresponding processing on the ultra-wideband signal by using the foregoing components. For example, the down-conversion apparatus (42) performs down-conversion processing on an intermediate frequency signal (an IQ modulation signal), and details are not described herein.

In this embodiment of the present application, at least two radio frequency channels are disposed in parallel, each radio frequency channel covers a frequency range, and the radio frequency channels work in different working frequencies, so that relatively high wireless communication performance is maintained when an ultra wide bandwidth is implemented. In addition, a difficulty in hardware implementation can also be reduced to a greatest extent, and a relatively large performance gain can be obtained.

Optionally, there may be one or more antennas (45). When there are multiple antennas (45), the multiple antennas (45) each cooperatively work with a radio frequency channel, corresponding to each antenna (45), of the at least two radio frequency channels (41), so as to ensure strong performance of each antenna (45) within a working frequency band of the antenna (45). In addition, the at least two radio frequency channels (41) and the multiple antennas (45) may be in a one-to-one correspondence, or may be in a many-to-one or one-to-many correspondence, which is not limited in the present application.

The receiver provided in this embodiment of the present application is described in detail by using a specific embodiment.

Figure 5:
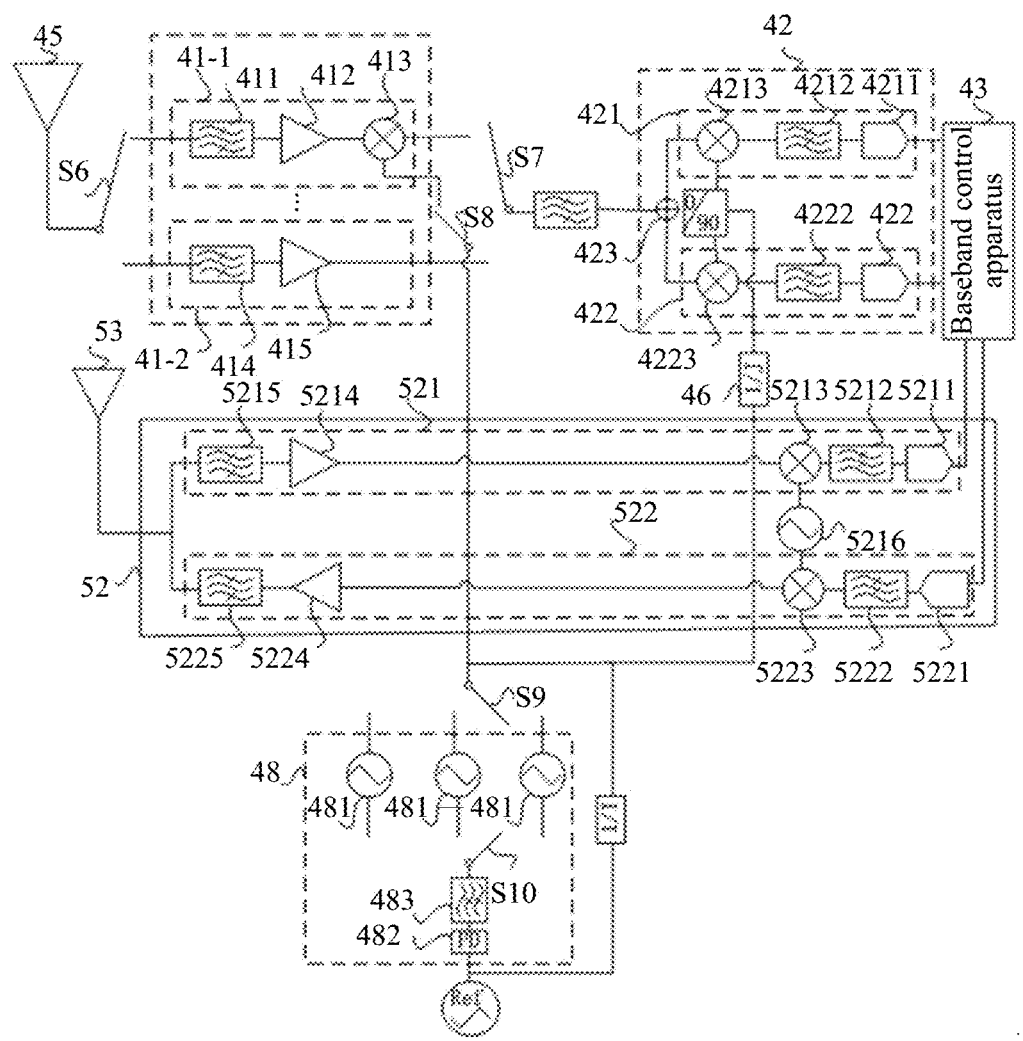
FIG. 5 is a schematic structural diagram of Embodiment 2 of a receiver according to the present application.

FIG. 5 is a schematic structural diagram of Embodiment 2 of a receiver according to the present application. This embodiment of the present application makes improvements based on the embodiment shown in FIG. 4. As shown in FIG. 5, the down-conversion apparatus (42) may include an in-phase demodulation channel (421), a quadrature demodulation channel (422) that is disposed in parallel with the in-phase demodulation channel (421), and a decomposer (423).

The decomposer (423) is configured to decompose the intermediate frequency signal obtained by the radio frequency channel (41) into an in-phase demodulation intermediate frequency signal and a quadrature demodulation intermediate frequency signal, where a first end of the decomposer (423) is used as an input end of the down-conversion apparatus (42), a second end of the decomposer (423) is connected to an input end of the in-phase demodulation channel (421), and a third end of the decomposer (423) is connected to an input end of the quadrature demodulation channel (422). The in-phase demodulation channel (421) is connected to the baseband control apparatus (43), and is configured to: perform down-conversion on the in-phase demodulation intermediate frequency signal obtained by the decomposer (423), to obtain an in-phase baseband signal, and transmit the in-phase baseband signal to the baseband control apparatus (43). The quadrature demodulation channel (422) is connected to the baseband control apparatus (43), and is configured to: perform down-conversion on the quadrature demodulation intermediate frequency signal obtained by the decomposer (423), to obtain a quadrature baseband signal, and transmit the quadrature baseband signal to the baseband control apparatus (43).

Further, the in-phase demodulation channel (421) may include a first analog-to-digital converter (4211), and a first filter (4212) and a first demodulator (4213) that are disposed in series with the first analog-to-digital converter (4211. A first end of the first demodulator (4213) is used as the input end of the in-phase demodulation channel (421), and a second end of the first demodulator (4213) is connected to a frequency divider (46). The frequency divider (46) may be configured to provide a first demodulation signal for the first demodulator (4213), and the first demodulator (4213) may be configured to demodulate, by using the first demodulation signal provided by the frequency divider 46, the in-phase intermediate frequency signal obtained by the decomposer (423), to obtain an in-phase demodulation signal. An input end of the first filter (4212) is connected to an output end of the first demodulator (4213), and the first filter (4212) may be configured to filter the in-phase demodulation signal obtained by the first demodulator (4213), to obtain a first filtered signal. An input end of the first analog-to-digital converter (4211) is connected to an output end of the first filter (4212), and is configured to perform analog-to-digital conversion on the first filtered signal obtained by the first filter (4212), to obtain the in-phase baseband signal. An output end of the first analog-to-digital converter (4211) is connected to the baseband control apparatus (43).

The quadrature demodulation channel (422) may include a second analog-to-digital converter (4221), and a second filter (4222) and a second demodulator (4223) that are disposed in series with the second analog-to-digital converter (4221). A first end of the second demodulator (4223) is used as the input end of the quadrature demodulation channel (422), and a second end of the second demodulator (4223) is connected to the frequency divider (46). The frequency divider (46) may be further configured to provide a second demodulation signal for the second demodulator (4223), and the second demodulator (4223) may be configured to demodulate, by using the second demodulation signal provided by the frequency divider (46), the quadrature intermediate frequency signal obtained by the decomposer (423), to obtain a quadrature demodulation signal. A phase difference between the second demodulation signal and the foregoing first demodulation signal is a preset value, and a signal that is inputted to the frequency divider (46) is provided by at least one phase-locked loop (48). An input end of the second filter (4222) is connected to an output end of the second demodulator (4223), and the second filter (4222) may be configured to filter the quadrature demodulation signal obtained by the second demodulator (4223), to obtain a second filtered signal. An input end of the second analog-to-digital converter (4221) is connected to an output end of the second filter (4222), and the second analog-to-digital converter (4221) may be configured to perform analog-to-digital conversion on the second filtered signal obtained by the second filter (4222), to obtain the quadrature baseband signal. An output end of the second analog-to-digital converter (4221) is connected to the baseband control apparatus (43).

In addition, the phase-locked loop 48 may include multiple VCOs (481), a phase detector (Phase Detector, PD for short) (482), and a loop filter (483). A VCO with a proper frequency band may be selected according to different frequency configuration status, to provide a local oscillator signal for link frequency conversion. The phase detector (482) detects a phase difference between input signals of the phase detector (482), and converts the detected phase difference signal into a voltage signal for output. After being filtered by using the loop filter 483, the signal forms a control voltage of the voltage-controlled oscillator (481), to control a frequency of an output signal of the voltage-controlled oscillator (481).

It should be noted that, the at least two radio frequency channels include a given quantity of superheterodyne structure links and zero-IF structure links. That is, at least one of the at least two radio frequency channels is a superheterodyne structure link (41-1), and the superheterodyne structure link (41-1) may include: a third filter (411), a first amplifier (412), and a first mixer (413).

The third filter (411) is connected to the first amplifier (412) in sequence, an input end of the third filter (411) is used as an input end of the at least one radio frequency channel (41), and the third filter (411) is configured to filter a radio frequency signal received by the antenna (45), which is corresponding to the frequency band covered by the at least one superheterodyne structure link (41-1), to obtain a third filtered signal. An input end of the first amplifier (412) is connected to an output end of the third filter (411), and the first amplifier (412) may be configured to amplify the third filtered signal obtained by the third filter (411), to obtain a first amplified signal. A first end of the first mixer (413) is connected to an output end of the first amplifier (412). A second end of the first mixer (413) is connected to the phase-locked loop (48 by using a third switch S8 and a fourth switch S9, and may be configured to receive a first local oscillator signal provided by the phase-locked loop (48). An output end of the first mixer (413) is connected to the input end of the down-conversion apparatus (42) by using the second switch S7. The first mixer (413) may be configured to perform, according to the first local oscillator signal provided by the phase-locked loop (48), frequency conversion on the first amplified signal obtained by the first amplifier (412), to obtain the intermediate frequency signal.

In addition, at least one of the at least two radio frequency channels is a zero-IF structure link (41-2). The zero-IF structure link (41-2) may include a fourth filter (414) and a second amplifier (415). The fourth filter (414 is connected to the second amplifier (415) in sequence, an input end of the fourth filter (414) is used as an input end of the at least one radio frequency channel (41), and the fourth filter (414) may be configured to filter a radio frequency signal received by the antenna (45), which is corresponding to the at least one zero-IF structure link (41-2), to obtain a fourth filtered signal. An input end of the second amplifier (415) is connected to an output end of the fourth filter (414). The second amplifier (415) may be configured to amplify the fourth filtered signal obtained by the fourth filter (414), to obtain the intermediate frequency signal. An output end of the second amplifier (415) is connected to the input end of the down-conversion apparatus (42) by using the second switch S7.

Based on the foregoing, the receiver (40) may further include an auxiliary channel (52). The auxiliary channel (52) is connected to the baseband control apparatus (43), and is configured to transmit frequency configuration information and system information between the auxiliary channel (52) and the baseband control apparatus (43). The baseband control apparatus (43) may be further configured to control, by using the frequency configuration information, selection of the at least two radio frequency channels and selection of local oscillators corresponding to the at least two radio frequency channels.

Optionally, the receiver (40) may further include an antenna (53). The antenna (53) is connected to the auxiliary channel (52), and is configured to: transmit a signal transmitted by the auxiliary channel (52), or receive a signal that is transmitted by another device by using an auxiliary channel of the another device and transmit the signal to the baseband control apparatus (43) by using the auxiliary channel (52). The foregoing system information includes various kinds of system information when a communications system in which the receiver (40) is located is used for networking; and a source of the frequency configuration information may be in multiple implementation manners, for example, an upper-layer software configuration. The antenna (53) and the antenna (45) may be a same antenna, or the antenna (53) is an exclusive antenna of the auxiliary channel (52), and is configured to transmit a signal transmitted by the auxiliary channel (52) and/or transmit a signal received by the antenna (53) to the auxiliary channel (52).

An auxiliary channel for implementing the foregoing functions may be in multiple forms, and details are described by using only an example herein. For example, the auxiliary channel (52) may include a receive auxiliary channel (521). The receive auxiliary channel (521) may include a digital-to-analog converter (5211), and a fifth filter (5212), a second mixer (5213), a third amplifier (5214) and a sixth filter (5215) that are disposed in series with the digital-to-analog converter (5211).

An output end of the digital-to-analog converter (5211) is connected to the baseband control apparatus (43), an input end of the digital-to-analog converter (5211) is connected to an output end of the fifth filter (5212, and the digital-to-analog converter (5211) may be configured to: perform digital-to-analog conversion on a fifth filtered signal obtained by the fifth filter (5212), to obtain a converted signal, and transmit the converted signal to the baseband control apparatus (43). An input end of the fifth filter (5212) is connected to an output end of the second mixer (5213), and may be configured to filter a frequency-converted signal obtained by the second mixer (5213), to obtain the foregoing fifth filtered signal. A first end of the second mixer (5213) is connected to an output end of the third amplifier (5214), and a second end of the second mixer (5213) is connected to an auxiliary-channel voltage-controlled oscillator (5216). The auxiliary-channel voltage-controlled oscillator (5216) may be configured to provide a second local oscillator signal for the second mixer (5213), and the second mixer (5213) may be configured to perform, according to the second local oscillator signal provided by the auxiliary-channel voltage-controlled oscillator (5216), frequency conversion on an amplified signal obtained outputted by the third amplifier (5214), to obtain the frequency-converted signal. An input end of the third amplifier (5214) is connected to an output end of the sixth filter (5215), and is configured to amplify a filtered signal obtained outputted by the sixth filter (5215), to obtain the amplified signal. An input end of the sixth filter (5215) is used as an input end of the receive auxiliary channel (521), is connected to the antenna (53), and is configured to filter the radio frequency signal received by the antenna (53), to obtain the filtered signal.

Based on the foregoing, the auxiliary channel (52) may further include a transmit auxiliary channel (522), where the transmit auxiliary channel (522) may include a third analog-to-digital converter (5221), and a seventh filter (5222), a third mixer (5223), a fourth amplifier (5224) and an eighth filter (5225) that are disposed in series with the third analog-to-digital converter (5221).

An input end of the third analog-to-digital converter (5221) is connected to the baseband control apparatus (43), and may be configured to perform analog-to-digital conversion on a pre-transmit signal or a control signal which is obtained by the baseband control apparatus (43) to obtain a digital signal, and the control signal is a control signal used by the baseband control apparatus (43) to control selection of the at least two radio frequency channels (41) and selection of the local oscillators corresponding to the at least two radio frequency channels (41). An input end of the seventh filter (5222) is connected to an output end of the third analog-to-digital converter (5221), and may be configured to filter the digital signal obtained by the third analog-to-digital converter (5221), to obtain a sixth filtered signal. A first end of the third mixer (5223) is connected to an output end of the seventh filter (5222), and a second end of the third mixer (5223) is connected to the auxiliary-channel voltage-controlled oscillator (5216). The auxiliary-channel voltage-controlled oscillator (5216) may be configured to provide a third local oscillator signal for the third mixer (5223), and the third mixer (5223) may be configured to perform frequency conversion on the sixth filtered signal obtained by the seventh filter (5222), to obtain a frequency-converted signal. An input end of the fourth amplifier (5224) is connected to an output end of the third mixer (5223), and may be configured to amplify the frequency-converted signal obtained outputted by the third mixer (5223), to obtain an amplified signal. An input end of the eighth filter (5225) is connected to an output end of the fourth amplifier (5224), an output end of the eighth filter (5225) is used as an output end of the transmit auxiliary channel (522) and is connected to the antenna (53), and the eighth filter (5225) may be configured to filter the amplified signal obtained by the fourth amplifier (5224), to obtain a signal to be transmitted by the antenna (53).

It should be additionally noted that, the foregoing auxiliary channel (52) may be further configured to transmit service data. Optionally, a working frequency of the auxiliary channel (52) may fall within an unlicensed frequency band, or may be a frequency band corresponding to a specific service, which is not limited in the present application.

According to this embodiment of the present application, an architecture of at least two radio frequency channels is used, and each radio frequency channel covers a frequency range. In this way, a difficulty in hardware design is reduced to a greatest extent, and a relatively large performance gain can be obtained. A specialized auxiliary channel is disposed on a receiver end, which can transmit frequency configuration information in real time and can automatically complete a frequency configuration for an ultra-wideband signal transmit end. In addition, the auxiliary channel also plays a role of a service transmission channel, and is configured to transmit service data, to implement efficient channel utilization. A solution of combining a superheterodyne structure with a zero-IF structure is used for a radio frequency, which can lower system complexity to a greatest extent on the premise that relatively high system performance is ensured. A switch is used to perform switching between radio frequency channels and between local oscillators, which can make full use of a baseband control apparatus to control the switch, and provide intelligent frequency switch.

The following describes interaction between the transmitter (20) shown in FIG. 3 and the receiver 40 shown in FIG. 5.

Figure 6:
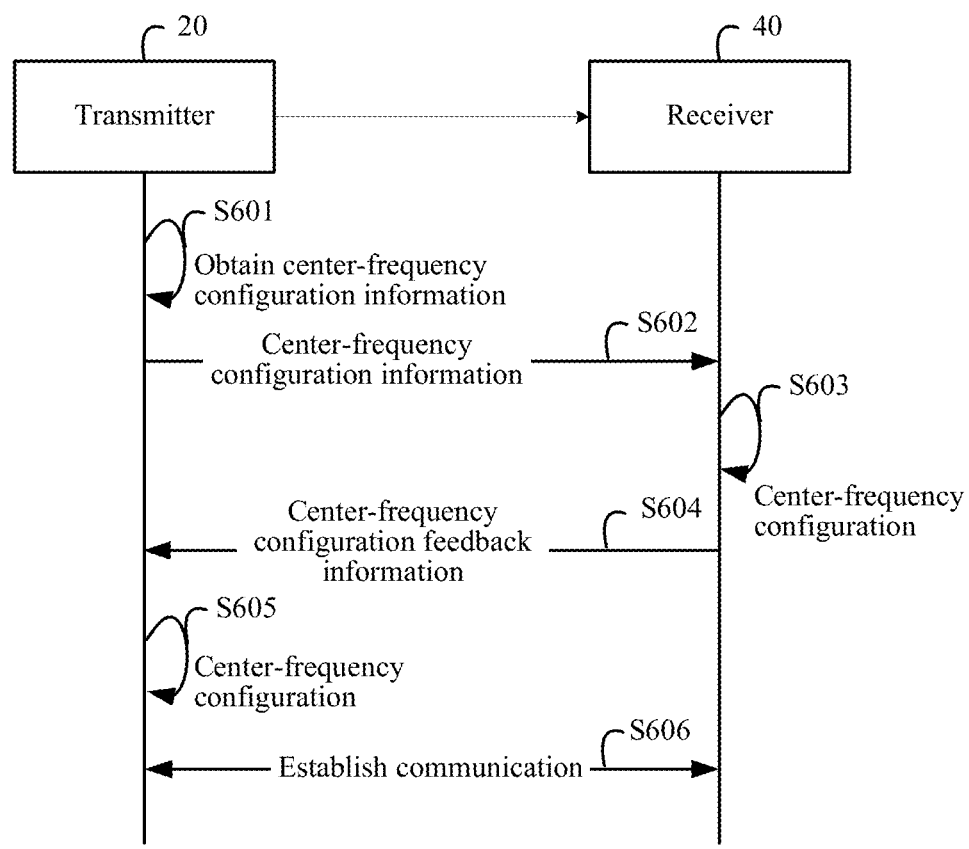
FIG. 6 is a schematic flowchart of frequency configuration between a transmitter and a receiver according to the present application.

Specifically, as shown in FIG. 6:

S601: The transmitter (20) obtains frequency configuration information.

Specifically, the baseband control apparatus (21) in the transmitter (20) obtains information about a frequency required for working, and transmits a request for transmitting frequency configuration information.

S602: The transmitter (20) transmits the frequency configuration information to the receiver 40.

Specifically, the transmitter (20) transmits the frequency configuration information by using the transmit auxiliary channel 311. Correspondingly, the receive auxiliary channel 521 of the receiver 40 receives the frequency configuration information.

S603: The receiver (40) performs a frequency configuration.

The baseband control apparatus (43) in the receiver (40) processes the frequency configuration information, and completes the frequency configuration for the receiver (40). In a configuration process, according to the frequency configuration information, the baseband control apparatus (43) controls the first switch S6 and the second switch S7 to select a correct receive radio frequency channel (a radio frequency channel), and controls the third switch S8, the fourth switch S9, and a fifth switch S10 to transmit a correct local oscillator signal to the selected receive radio frequency channel.

S604: The receiver 40 transmits frequency configuration feedback information to the transmitter (20).

After the receive radio frequency channel of the receiver (40) completes a configuration, the baseband control apparatus (43) requests to transmit frequency configuration feedback information, and transmits the frequency configuration feedback information to the transmitter (20) by using the transmit auxiliary channel (522) of the receiver (40).

S605: The transmitter (20) performs a frequency configuration.

After the transmitter (20) receives configuration completion information of the receiver (40), the transmitter (20) completes its own frequency configuration.

S606: The transmitter (20) establishes communication with the receiver (40).

When receiving center-frequency change information, the baseband control apparatus in the transmitter automatically completes a frequency change configuration according to a frequency configuration procedure shown in FIG. 6. A working frequency of an auxiliary channel may fall within an unlicensed frequency band, or may fall within a frequency band for transmitting a specific service. In addition, the auxiliary channel may also play a role of a service transmission channel, that is, the auxiliary channel completes transmission of frequency or management information, and is also used as a transmission channel of service data; in this way, a radio frequency channel resource is effectively utilized.

Figure 7:
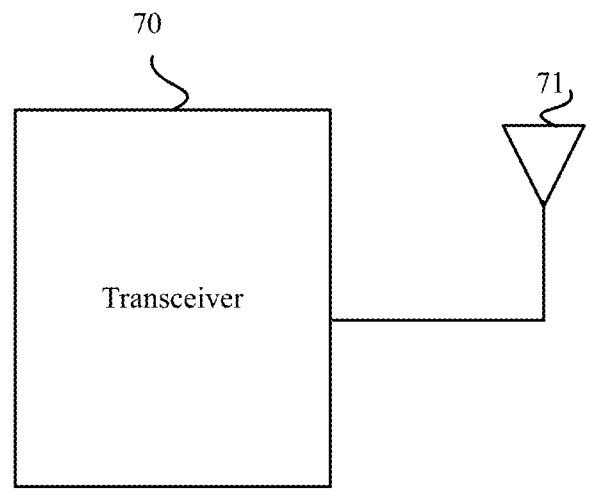
FIG. 7 is an exemplary diagram of using an ultra-wideband antenna according to the present application.
Figure 8:
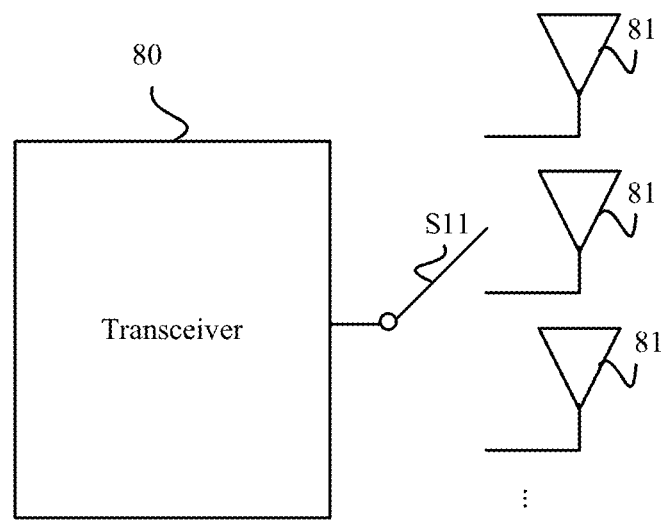
FIG. 8 is an exemplary diagram of using multiple antennas according to the present application.

Antenna solutions of the transmitter and the receiver in the embodiments of the present application are shown in FIG. 7 and FIG. 8. FIG. 7 is an exemplary diagram of using an ultra-wideband antenna according to the present application. FIG. 8 is an exemplary diagram of using multiple antennas according to the present application. As shown in FIG. 7, an ultra-wideband antenna (71) in a transceiver (70) covers all frequency bands of an ultra-wideband signal. In this solution, the structure is simple; however, it is difficult to maintain strong performance of the ultra-wideband antenna (71) within a wide frequency band range, and a solution shown in FIG. 8 is an improvement made to the solution shown in FIG. 7. As shown in FIG. 8, in a transceiver 80, each antenna (81) covers a frequency range of an ultra-wideband signal, which can ensure that strong performance of each antenna (81) is maintained within a working frequency band of the antenna (81). Optionally, the transceiver (80) chooses, by using a switch S11, to connect to different antennas (81).

Figure 9:
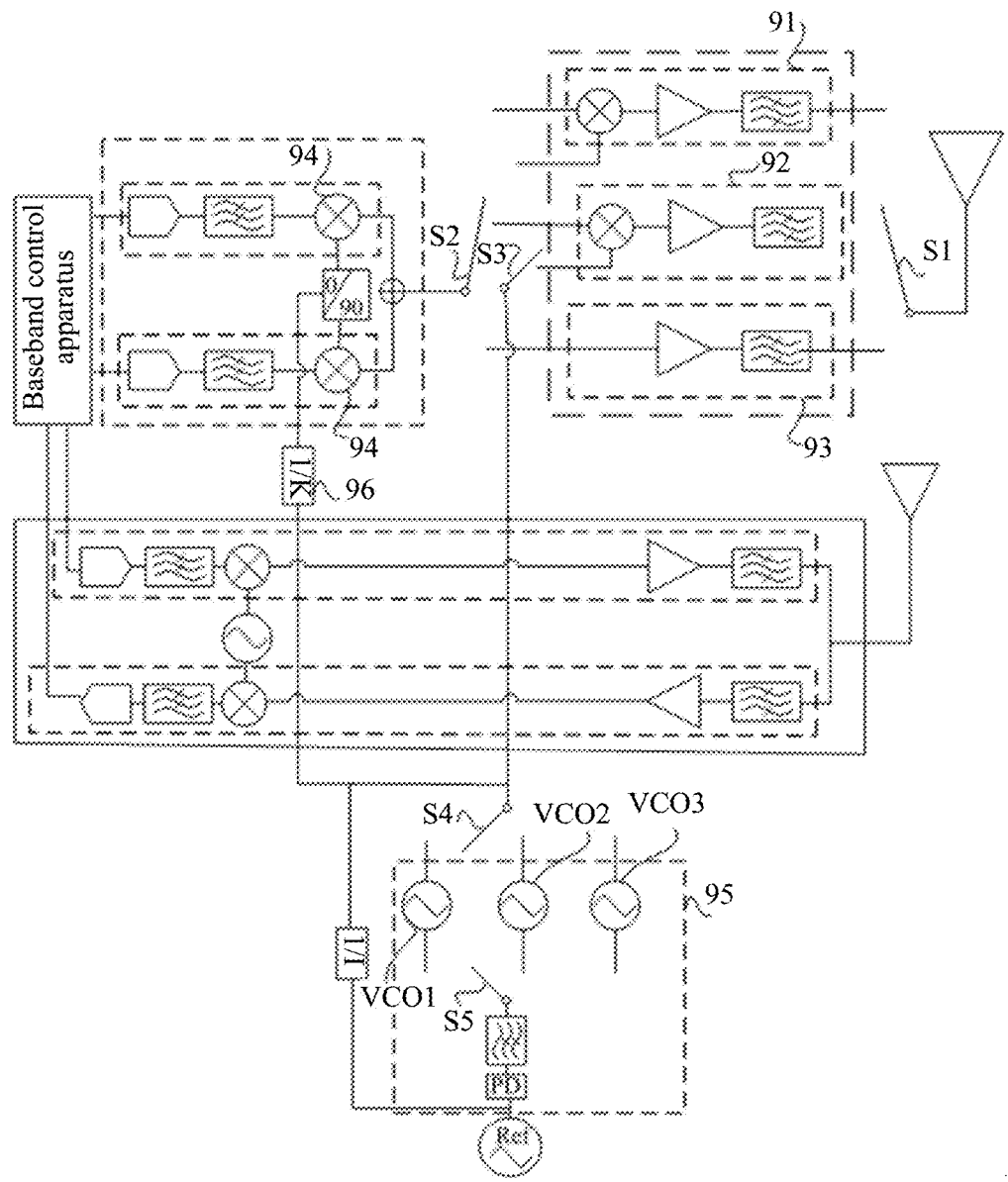
FIG. 9 is a schematic structural diagram of Embodiment 3 of a transmitter according to the present application.
Figure 10:
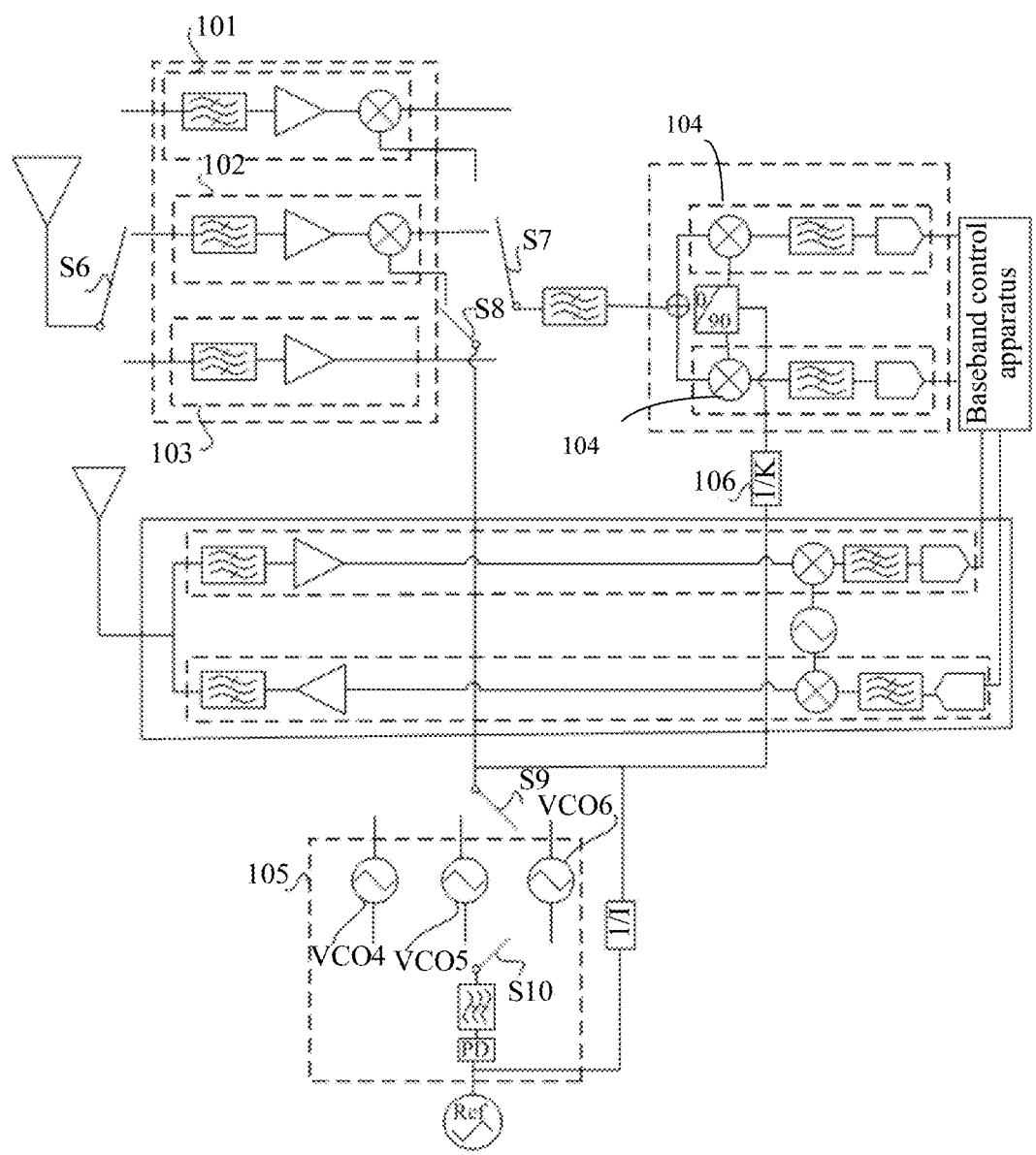
FIG. 10 is a schematic structural diagram of Embodiment 3 of a receiver according to the present application.

FIG. 9 is a schematic structural diagram of Embodiment 3 of a transmitter according to the present application. FIG. 10 is a schematic structural diagram of Embodiment 3 of a receiver according to the present application. FIG. 9 and FIG. 10 show a solution of transmit end and receive end of the ultra wideband signal respectively.

As shown in FIG. 9, this embodiment of the present application provides a transmitter with a frequency range of 6 GHz to 100 GHz, and there are three radio frequency channels. A radio frequency channel (91) is configured to cover a frequency range of 66 GHz to 100 GHz, a radio frequency channel (92) is configured to cover a frequency range of 33 GHz to 66 GHz, and a radio frequency channel (93) covers a frequency range of 6 GHz to 33 GHz. Due to relatively high working frequencies, the radio frequency channel (91) and the radio frequency channel (92) use superheterodyne architectures, and two times of frequency conversion are performed in superheterodyne architectures link to reach a frequency coverage area; the radio frequency channel (93) is a zero-IF structure link, and performs amplification and filtering on a signal from an IQ modulator (94). In addition, a phase-locked loop (95) includes three VCOs, which are a VCO1, a VCO2, and a VCO3. The VCO1 covers frequency of 6 GHz to 33 GHz, the VCO2 covers 30 GHz to 60 GHz, and the VCO3 covers 60 GHz to 100 GHZ. These VCOs provide a second local oscillator signal for each radio frequency channel by using switches S3 and S4, and provide a first local oscillator signal for the IQ modulator (94) by using a 1/K frequency divider (96).

TABLE 1

Frequency configuration relationship

| Working frequency band (GHz) | Selection of a VCO | Selection of a radio frequency channel | Coefficient of a 1/K frequency divider |
|---|---|---|---|
| 66~100 | VCO3 | Radio frequency channel 91 | 10 |
| 33~66 | VCO2 | Radio frequency channel 92 | 10 |
| 6~33 | VCO1 | Radio frequency channel 93 | 0 |

Table 1 lists a frequency configuration relationship for the transmitter shown in FIG. 9, where the frequency configuration relationship includes selection of a radio frequency channel, selection of a VCO, selection of a frequency dividing coefficient of a frequency divider, and the like.

As shown in FIG. 10, this embodiment of the present application provides a receiver with a frequency range of 6 GHz to 100 GHz, and there are three radio frequency channels. A radio frequency channel (101) is configured to cover a frequency range of 66 GHz to 100 GHz, a radio frequency channel (102) is configured to cover a frequency range of 33 GHz to 66 GHz, and a radio frequency channel (103) covers a frequency range of 6 GHz to 33 GHz. Due to relatively high working frequencies, the radio frequency channel (101) and the radio frequency channel 102 use superheterodyne architectures, and two times of frequency conversion are performed in superheterodyne architectures link to reach a frequency coverage area; the radio frequency channel 103 is a zero-IF structure link. In addition, a phase-locked loop (105) includes three VCOs, which are a VCO4, a VCO5, and a VCO6. The VCO4 covers a frequency range of 6 GHz to 33 GHz, the VCO5 covers 30 GHz to 60 GHz, and the VCO6 covers 60 GHz to 100 GHZ. These VCOs provide a second local oscillator signal for each radio frequency channel by using switches S8 and S9, and provide a first local oscillator signal for an IQ modulator (104) by using a 1/K frequency divider (106).

TABLE 2

Frequency configuration relationship

| Working frequency band (GHz) | Selection of a VCO | Selection of a radio frequency channel | Coefficient of a 1/K frequency divider |
|---|---|---|---|
| 66~100 | VCO6 | Radio frequency channel 101 | 10 |
| 33~66 | VCO5 | Radio frequency channel 102 | 10 |
| 6~33 | VCO4 | Radio frequency channel 103 | 0 |

Table 2 lists a frequency configuration relationship for the receiver shown in FIG. 10, where the frequency configuration relationship includes selection of a radio frequency channel, selection of a VCO, selection of a frequency dividing coefficient of a frequency divider, and the like.

Figure 11:
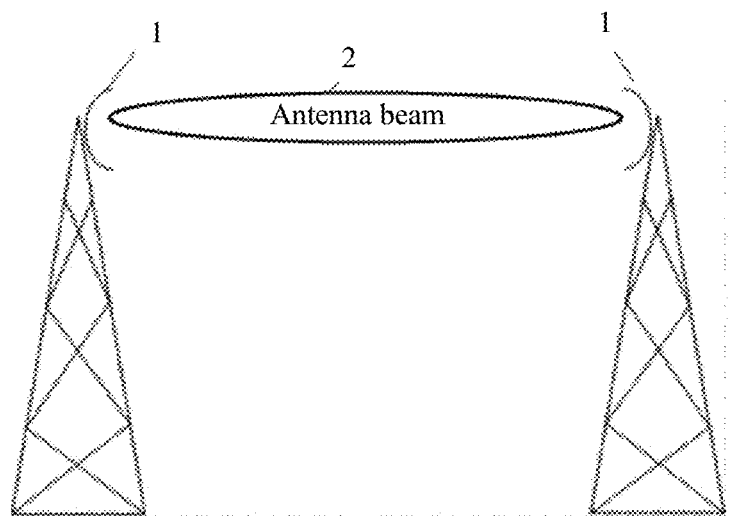
FIG. 11 shows an example in which a wireless communications system is used for a microwave point-to-point application according to the present application.
Figure 12:
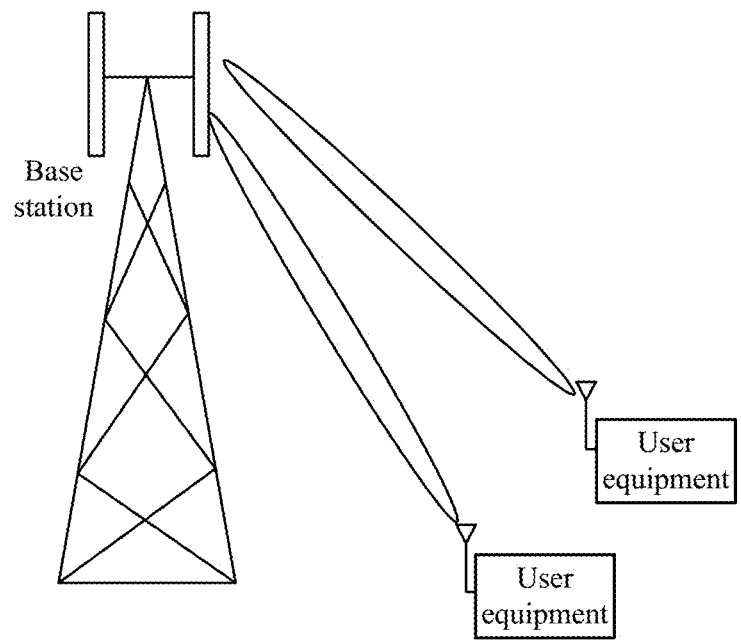
FIG. 12 is a scenario diagram of mobile communication.
Figure 13:
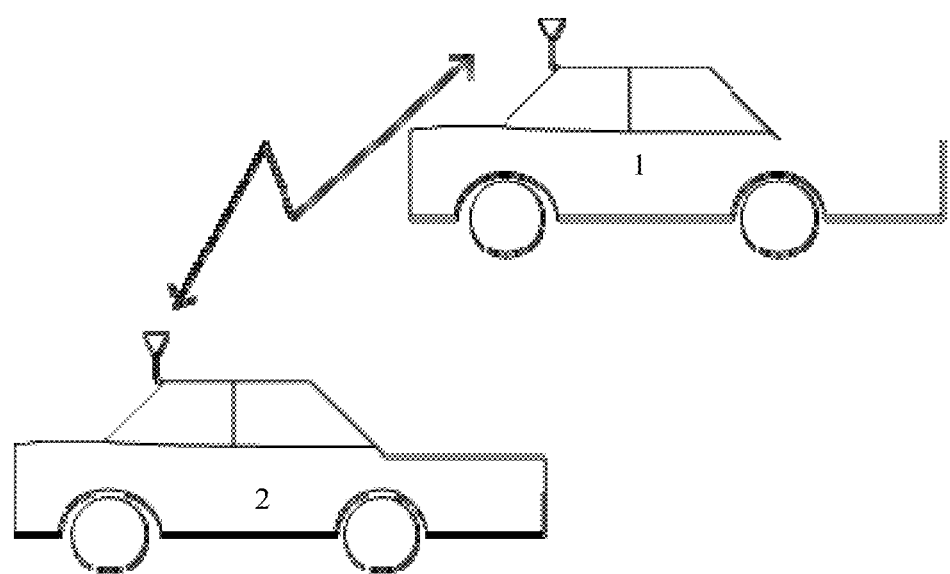
FIG. 13 shows a typical application scenario of device-to-device communication.

An ultra-wideband signal processing method and device in the embodiments of the present application may be applied to the following scenario (that is, an ultra-wideband signal processing system in the embodiments of the present application may be a system listed as follows): a microwave point-to-point or point-to-multipoint large-capacity transmission system, a mobile communications access network system, a device-to-device (Device to Device, D2D for short) communications system etc. FIG. 11 shows an example in which a wireless communications system is used for a microwave point-to-point application according to the present application, where the wireless communications system is applied to a transceiver at an antenna 1, and performs communication by using an antenna beam 2. FIG. 12 is a scenario diagram of mobile communication, where a communications system is configured to perform communication between a base station (Base Station) and a user equipment (UE) device. FIG. 13 shows a typical application scenario of device-to-device communication, where in this application scenario, wideband radio communication between a motorcar 1 and a motorcar 2 is provided.

It should be noted that, switches used in any embodiment of the present application are all digitally controlled. It is only required that a baseband control apparatus sends a related control instruction, to control a switch to connect to a specific channel, so that the corresponding channel is active, and data is transmitted by using the channel (different channels correspond to different working frequencies), thereby implementing an automatic switching function of a transmitter or a receiver within a relatively wide working frequency range. Another switch, for example, a switch connected to an antenna, has a similar function and is configured to select an antenna suitable for a working frequency band. Likewise, a switch in a VCO part enables VCOs working in different frequency bands to connect to a link. The foregoing switches refer to switches used in any embodiment of the present application, for example, a first switch in Embodiment 1.

The foregoing transmitter and receiver may be disposed independently, or may be disposed in an integrated manner, which is not limited in the present application.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A transmitter, comprising:
 a baseband control apparatus, configured to generate a baseband signal;
 an up-conversion apparatus, connected to the baseband control apparatus, and configured to perform up-conversion on the baseband signal generated by the baseband control apparatus, to obtain an intermediate frequency signal;
 at least two radio frequency channels disposed in parallel, wherein one side of the at least two radio frequency channels is connected in series with the up-conversion apparatus by using a second switch; the at least two radio frequency channels jointly cover an entire frequency band of a radio frequency signal; and each radio frequency channel covers a different frequency band of the radio frequency signal, and is configured to perform frequency conversion, amplification, and filtering on the intermediate frequency signal obtained by the up-conversion apparatus, to obtain the radio frequency signal corresponding to the frequency band covered by the each radio frequency channel; and
 an antenna, wherein the antenna is connected in series with an output end of one radio frequency channel of the at least two radio frequency channels by using a first switch, and is configured to transmit the radio frequency signal obtained by each radio frequency channel connected to the antenna.

2. The transmitter according to claim 1, wherein the up-conversion apparatus comprises an in-phase modulation channel, a quadrature modulation channel that is disposed in parallel with the in-phase modulation channel, and a synthesizer, wherein
 the in-phase modulation channel is connected to the baseband control apparatus, configured to perform up-conversion on the baseband signal generated by the baseband control apparatus, to obtain an in-phase intermediate frequency signal;
 the quadrature modulation channel is connected to the baseband control apparatus, configured to perform up-conversion on the baseband signal generated by the baseband control apparatus, to obtain a quadrature intermediate frequency signal; and
 a first end of the synthesizer is connected to an output end of the in-phase modulation channel, a second end of the synthesizer is connected to an output end of the quadrature modulation channel, and a third end of the synthesizer is used as an output end of the up-conversion apparatus; and the synthesizer is configured to synthesize the in-phase intermediate frequency signal obtained by the in-phase modulation channel and the quadrature intermediate frequency signal obtained by the quadrature modulation channel, to obtain the intermediate frequency signal.

3. The transmitter according to claim 2, wherein:
the in-phase modulation channel comprises a first digital-to-analog converter, and a first filter and a first modulator that are disposed in series with the first digital-to-analog converter, wherein an input end of the first digital-to-analog converter is connected to the baseband control apparatus, and is configured to convert the baseband signal generated by the baseband control apparatus into a first analog signal; an input end of the first filter is connected to an output end of the first digital-to-analog converter, and is configured to filter the first analog signal obtained outputted by the first digital-to-analog converter, to obtain a first filtered signal; a first end of the first modulator is connected to an output end of the first filter, a second end of the first modulator is connected to a frequency divider, the frequency divider is configured to provide a first modulation signal for the first modulator, and a third end of the first modulator is connected to the first end of the synthesizer; and the first modulator is configured to modulate, by using the first modulation signal provided by the frequency divider, the first filtered signal obtained outputted by the first filter, to obtain the in-phase intermediate frequency signal; and the quadrature modulation channel comprises a second digital-to-analog converter, and a second filter and a second modulator that are disposed in series with the second digital-to-analog converter, wherein an input end of the second digital-to-analog converter is connected to the baseband control apparatus, and is configured to convert the baseband signal generated by the baseband control apparatus into a second analog signal; an input end of the second filter is connected to an output end of the second digital-to-analog converter, and is configured to filter the second analog signal obtained outputted by the second digital-to-analog converter, to obtain a second filtered signal; a first end of the second modulator is connected to an output end of the second filter, a second end of the second modulator is connected to the frequency divider, the frequency divider is configured to provide a second modulation signal for the second modulator, a phase difference between the second modulation signal and the first modulation signal is a preset value, and a third end of the second modulator is connected to the second end of the synthesizer; and the second modulator is configured to modulate, by using the second modulation signal provided by the frequency divider, the second filtered signal obtained outputted by the second filter, to obtain the quadrature intermediate frequency signal, wherein a signal that is input to the frequency divider is provided by at least one phase-locked loop.

4. The transmitter according to claim 1, wherein at least one of the at least two radio frequency channels is a superheterodyne structure link comprising:
a first mixer, wherein a first end of the first mixer is connected to the output end of the up-conversion apparatus by using the second switch, and a second end of the first mixer is connected to the phase-locked loop by using a third switch and a fourth switch; and the first mixer is configured to: receive a first local oscillator signal provided by the phase-locked loop, and perform, according to the first local oscillator signal provided by the phase-locked loop, frequency conversion on the intermediate frequency signal obtained by the up-conversion apparatus, to obtain a frequency-converted signal;
a first amplifier, wherein an input end of the first amplifier is connected to an output end of the first mixer, and is configured to amplify the frequency-converted signal outputted by the first mixer, to obtain an amplified signal; and
a third filter, wherein an input end of the third filter is connected to an output end of the first amplifier, and is configured to filter the amplified signal obtained by the first amplifier, to obtain a radio frequency signal; and an output end of the third filter is used as an output end of the radio frequency channel.

5. The transmitter according to claim 4, wherein at least one of the at least two radio frequency channels is a zero-IF structure link comprising:
a second amplifier, wherein an input end of the second amplifier is connected to the output end of the up-conversion apparatus by using the second switch, and is configured to amplify the intermediate frequency signal obtained by the up-conversion apparatus, to obtain an amplified signal; and
a fourth filter, wherein an input end of the fourth filter is connected to an output end of the second amplifier, and is configured to filter the amplified signal obtained by the second amplifier, to obtain a radio frequency signal corresponding to the frequency band covered by the at least one zero-IF structure link; and an output end of the fourth filter is used as an output end of the radio frequency channel.

6. The transmitter according to claim 1, wherein the transmitter further comprises:
an auxiliary channel, connected to the baseband control apparatus, and configured to transmit frequency configuration information and system information between the auxiliary channel and the baseband control apparatus, wherein the baseband control apparatus is further configured to control, by using the frequency configuration information, selection of the at least two radio frequency channels and selection of local oscillators corresponding to the at least two radio frequency channels.

7. The transmitter according to claim 6, wherein the auxiliary channel comprises a transmit auxiliary channel, wherein
the transmit auxiliary channel comprises a third digital-to-analog converter, and a fifth filter, a second mixer, a third amplifier and a sixth filter that are disposed in series with the third digital-to-analog converter, wherein
an input end of the third digital-to-analog converter is connected to the baseband control apparatus, and is configured to perform digital-to-analog conversion on the frequency configuration information transmitted by the baseband control apparatus, to obtain a third analog signal;
an input end of the fifth filter is connected to an output end of the third digital-to-analog converter, and is configured to filter the third analog signal obtained by the third digital-to-analog converter, to obtain a third filtered signal;
a first end of the second mixer is connected to an output end of the fifth filter, and a second end of the second mixer is connected to an auxiliary-channel voltage-controlled oscillator; the auxiliary-channel voltage-controlled oscillator is configured to provide a second local oscillator signal for the second mixer; and the second mixer is configured to perform, according to the second local oscillator signal provided by the auxiliary-channel voltage-controlled oscillator, frequency conversion on the third filtered signal obtained by the fifth filter, to obtain a frequency-converted signal;

an input end of the third amplifier is connected to an output end of the second mixer, and is configured to amplify the frequency-converted signal obtained by the second mixer, to obtain an amplified signal; and an input end of the sixth filter is connected to an output end of the third amplifier, and is configured to filter the amplified signal obtained by the third amplifier, to obtain a pre-transmit signal or obtain a control signal for controlling selection of the at least two radio frequency channels and selection of the local oscillators corresponding to the at least two radio frequency channels; and an output end of the sixth filter is used as an output end of the transmit auxiliary channel and is connected to an antenna.

8. The transmitter according to claim 7, wherein the auxiliary channel further comprises a receive auxiliary channel, wherein the receive auxiliary channel comprises an analog-to-digital converter, and a seventh filter, a third mixer, a fourth amplifier and an eighth filter that are disposed in series with the analog-to-digital converter, wherein an output end of the analog-to-digital converter is connected to the baseband control apparatus, and is configured to: perform analog-to-digital conversion on a fourth filtered signal obtained outputted by the seventh filter, to obtain a converted signal, and transmit the converted signal to the baseband control apparatus;

an output end of the seventh filter is connected to an input end of the analog-to-digital converter, and is configured to: filter a frequency-converted signal obtained outputted by the third mixer, to obtain the fourth filtered signal, and transmit the fourth filtered signal to the analog-to-digital converter;

a first end of the third mixer is connected to an input end of the seventh filter, a second end of the third mixer is connected to an output end of the fourth amplifier, and a third end of the third mixer is connected to the auxiliary-channel voltage-controlled oscillator; the auxiliary-channel voltage-controlled oscillator is configured to provide a third local oscillator signal for the third mixer; and the third mixer is configured to: perform frequency conversion processing on an amplified signal obtained outputted by the fourth amplifier, and transmit a frequency-converted signal to the seventh filter;

an input end of the fourth amplifier is connected to an output end of the eighth filter, and is configured to amplify a filtered signal obtained by the eighth filter, to obtain the amplified signal; and an input end of the eighth filter is connected to the antenna, and the input end of the eighth filter is used as an input end of the receive auxiliary channel and is configured to filter a signal received by the antenna, to obtain the filtered signal.

9. A receiver, comprising:

at least two radio frequency channels disposed in parallel, a down-conversion apparatus, a baseband control apparatus, a first switch, a second switch, and an antenna, wherein the antenna is connected in series with an input end of one radio frequency channel of the at least two radio frequency channels by using the first switch, and is configured to: receive a radio frequency signal transmitted by a transmitter, and transmit the radio frequency signal to the radio frequency channel connected to the antenna;

each of the at least two radio frequency channels is configured to perform frequency conversion, amplification, and filtering on the radio frequency signal received by the antenna, which is corresponding to the frequency band covered by the at least one radio frequency channels, to obtain an intermediate frequency signal, where the at least two radio frequency channels jointly cover an entire frequency band of the radio frequency signal, and each radio frequency channel covers a different frequency band of the radio frequency signal; and the down-conversion apparatus is connected, by using the second switch, to an output end of a radio frequency channel of the at least two radio frequency channels that is connected to the antenna, and is configured to perform down-conversion on the intermediate frequency signal obtained by the radio frequency channel, to obtain a preprocessing signal of the baseband control apparatus.

10. The receiver according to claim 9, wherein the down-conversion apparatus comprises an in-phase demodulation channel, a quadrature demodulation channel that is disposed in parallel with the in-phase demodulation channel, and a decomposer, wherein the decomposer is configured to decompose the intermediate frequency signal obtained by the radio frequency channel into an in-phase intermediate frequency signal and a quadrature intermediate frequency signal, wherein a first end of the decomposer is used as an input end of the down-conversion apparatus, a second end of the decomposer is connected to an input end of the in-phase demodulation channel, and a third end of the decomposer is connected to an input end of the quadrature demodulation channel;

the in-phase demodulation channel is connected to the baseband control apparatus, and is configured to: perform down-conversion on the in-phase intermediate frequency signal obtained by the decomposer, to obtain an in-phase baseband signal, and transmit the in-phase baseband signal to the baseband control apparatus; and the quadrature demodulation channel is connected to the baseband control apparatus, and is configured to: perform down-conversion on the quadrature intermediate frequency signal obtained by the decomposer, to obtain a quadrature baseband signal, and transmit the quadrature baseband signal to the baseband control apparatus.

11. The receiver according to claim 10, wherein:

the in-phase demodulation channel comprises a first analog-to-digital converter, and a first filter and a first demodulator that are disposed in series with the first analog-to-digital converter, wherein a first end of the first demodulator is used as the input end of the in-phase demodulation channel, and a second end of the first demodulator is connected to a frequency divider; the frequency divider is configured to provide a first demodulation signal for the first demodulator, and the first demodulator is configured to demodulate, by using the first demodulation signal provided by the frequency divider, the in-phase intermediate frequency signal obtained by the decomposer, to obtain an in-phase demodulation signal; an input end of the first filter is connected to an output end of the first demodulator, and the first filter is configured to filter the in-phase demodulation signal obtained by the first demodulator, to obtain a first filtered signal; and an input end of the first analog-to-digital converter is connected to an output end of the first filter, and is configured to perform analog-to-digital conversion on the first filtered signal obtained by the first filter, to obtain the in-phase baseband signal, and an output end of the first analog-to-digital converter is connected to the baseband control apparatus; and the quadrature demodulation channel comprises a second analog-to-digital converter, and a second filter and a second demodulator that are disposed in series with the second analog-to-digital converter, wherein a first end of the second demodulator is used as the input end of the quadrature demodulation channel, and a second end of the second demodulator is connected to the frequency divider; the frequency divider is further configured to provide a second demodulation signal for the second demodulator, and the second demodulator is configured to demodulate, by using the second demodulation signal provided by the frequency divider, the quadrature intermediate frequency signal obtained by the decomposer, to obtain a quadrature demodulation signal, wherein a phase difference between the second demodulation signal and the first demodulation signal is a preset value, and a signal that is inputted to the frequency divider is provided by at least one phase-locked loop; an input end of the second filter is connected to an output end of the second demodulator, and the second filter is configured to filter the quadrature demodulation signal obtained by the second demodulator, to obtain a second filtered signal; and an input end of the second analog-to-digital converter is connected to an output end of the second filter, the second analog-to-digital converter is configured to perform analog-to-digital conversion on the second filtered signal obtained by the second filter, to obtain the quadrature baseband signal, and an output end of the second analog-to-digital converter is connected to the baseband control apparatus.

12. The receiver according to claim 9, wherein at least one of the at least two radio frequency channels is a superheterodyne structure link comprising: a third filter, a first amplifier, and a first mixer, wherein
the third filter is connected to the first amplifier in sequence, an input end of the third filter is used as an input end of the at least one radio frequency channel, and the third filter is configured to filter a radio frequency signal received by the antenna, which is corresponding to the frequency band covered by the at least one superheterodyne structure link, to obtain a third filtered signal;
an input end of the first amplifier is connected to an output end of the third filter, and the first amplifier is configured to amplify the third filtered signal obtained by the third filter, to obtain a first amplified signal; and
a first end of the first mixer is connected to an output end of the first amplifier; a second end of the first mixer is connected to the phase-locked loop by using a third switch and a fourth switch, and is configured to receive a first local oscillator signal provided by the phase-locked loop; an output end of the first mixer is connected to the input end of the down-conversion apparatus by using the second switch; and the first mixer is configured to perform, according to the first local oscillator signal provided by the phase-locked loop, frequency conversion on the first amplified signal obtained by the first amplifier, to obtain the intermediate frequency signal.

13. The receiver according to claim 12, wherein at least one of the at least two radio frequency channels is a zero-IF structure link comprising: a fourth filter and a second amplifier, wherein
the fourth filter is connected to the second amplifier in sequence, an input end of the fourth filter is used as an input end of the at least one radio frequency channel, and the fourth filter is configured to filter a radio frequency signal received by the antenna, which is corresponding to the at least one zero-IF structure link, to obtain a fourth filtered signal; and
an input end of the second amplifier is connected to an output end of the fourth filter; the second amplifier is configured to amplify the fourth filtered signal obtained by the fourth filter, to obtain the intermediate frequency signal; and an output end of the second amplifier is connected to the input end of the down-conversion apparatus by using the second switch.

14. The receiver according to claim 9, wherein the receiver further comprises:
an auxiliary channel, connected to the baseband control apparatus, and configured to transmit frequency configuration information and system information between the auxiliary channel and the baseband control apparatus, wherein the baseband control apparatus is further configured to control, by using the frequency configuration information, selection of the at least two radio frequency channels and selection of local oscillators corresponding to the at least two radio frequency channels.

15. The receiver according to claim 14, wherein the auxiliary channel comprises a receive auxiliary channel, and the receive auxiliary channel comprises a digital-to-analog converter, and a fifth filter, a second mixer, a third amplifier and a sixth filter that are disposed in series with the digital-to-analog converter, wherein
an output end of the digital-to-analog converter is connected to the baseband control apparatus, an input end of the digital-to-analog converter is connected to an output end of the fifth filter, and the digital-to-analog converter is configured to perform digital-to-analog conversion on a fifth filtered signal obtained by the fifth filter, to obtain a converted signal, and transmit the converted signal to the baseband control apparatus;
an input end of the fifth filter is connected to an output end of the second mixer, and is configured to filter a frequency-converted signal obtained by the second mixer, to obtain the fifth filtered signal;
a first end of the second mixer is connected to an output end of the third amplifier, and a second end of the second mixer is connected to an auxiliary-channel voltage-controlled oscillator; the auxiliary-channel voltage-controlled oscillator is configured to provide a second local oscillator signal for the second mixer; and the second mixer is configured to perform, according to the second local oscillator signal provided by the auxiliary-channel voltage-controlled oscillator, frequency conversion on an amplified signal obtained outputted by the third amplifier, to obtain the frequency-converted signal;
an input end of the third amplifier is connected to an output end of the sixth filter, and is configured to amplify a filtered signal obtained outputted by the sixth filter, to obtain the amplified signal; and an input end of the sixth filter is used as an input end of the receive auxiliary channel, is connected to an antenna, and is configured to filter the radio frequency signal received by the antenna, to obtain the filtered signal.

16. The receiver according to claim 15, wherein the auxiliary channel further comprises a transmit auxiliary channel, wherein the transmit auxiliary channel comprises a third analog-to-digital converter, and a seventh filter, a third mixer, a fourth amplifier and an eighth filter that are disposed in series with the third analog-to-digital converter, wherein an input end of the third analog-to-digital converter is connected to the baseband control apparatus, and is configured to perform analog-to-digital conversion on a pre-transmit signal or a control signal which is obtained by the baseband control apparatus to obtain a digital signal, and the control signal is a control signal used by the baseband control apparatus to control selection of the at least two radio frequency channels and selection of the local oscillators corresponding to the at least two radio frequency channels;

an input end of the seventh filter is connected to an output end of the third analog-to-digital converter, and is configured to filter the digital signal obtained by the third analog-to-digital converter, to obtain a sixth filtered signal;

a first end of the third mixer is connected to an output end of the seventh filter, and a second end of the third mixer is connected to the auxiliary-channel voltage-controlled oscillator; the auxiliary-channel voltage-controlled oscillator is configured to provide a third local oscillator signal for the third mixer; and the third mixer is configured to perform frequency conversion on the sixth filtered signal obtained by the seventh filter, to obtain a frequency-converted signal;

an input end of the fourth amplifier is connected to an output end of the third mixer, and is configured to amplify the frequency-converted signal obtained outputted by the third mixer, to obtain an amplified signal; and an input end of the eighth filter is connected to an output end of the fourth amplifier, an output end of the eighth filter is used as an output end of the transmit auxiliary channel and is connected to the antenna, and the eighth filter is configured to filter the amplified signal obtained by the fourth amplifier, to obtain a signal to be transmitted by the antenna.

\* \* \* \* \*